(12) United States Patent
Disantis

(10) Patent No.: US 11,732,740 B2
(45) Date of Patent: Aug. 22, 2023

(54) BLIND FASTENER

(71) Applicant: Sky Climber Fasteners LLC, Delaware, OH (US)

(72) Inventor: Raymond Disantis, Willoughby Hills, OH (US)

(73) Assignee: SKY CLIMBER FASTENERS LLC, Delaware, OH (US)

( * ) Notice: Subject to any disclaimer, the term of this patent is extended or adjusted under 35 U.S.C. 154(b) by 267 days.

(21) Appl. No.: 17/317,314

(22) Filed: May 11, 2021

(65) Prior Publication Data

US 2021/0355978 A1 Nov. 18, 2021

Related U.S. Application Data

(60) Provisional application No. 63/023,519, filed on May 12, 2020.

(51) Int. Cl.
| | |
|---|---|
| *F16B 13/06* | (2006.01) |
| *F16B 29/00* | (2006.01) |
| *F16B 21/02* | (2006.01) |
| *F16B 37/04* | (2006.01) |
| *F16B 13/04* | (2006.01) |

(52) U.S. Cl.
CPC .................................. *F16B 13/04* (2013.01)

(58) Field of Classification Search
CPC .... F16B 13/04; F16B 13/0891; F16B 13/066; F16B 13/06; F16B 29/00; F16B 21/00; F16B 21/02; F16B 37/04; F16B 19/109; F16B 13/05; F16B 13/045; F16B 13/0825; F16B 13/124; F16B 13/128
USPC ................ 411/24–28, 54, 75–80, 49–50, 55
See application file for complete search history.

(56) References Cited

U.S. PATENT DOCUMENTS

| | | | |
|---|---|---|---|
| 127,934 | A | 6/1872 | Stone |
| 462,601 | A | 11/1891 | Thinnes |
| 679,363 | A | 7/1901 | Church |
| 976,096 | A | 11/1910 | Pansch |
| 1,075,759 | A | 10/1913 | Burridge |
| 1,158,633 | A | 11/1915 | Carpenter |
| 1,340,470 | A | 5/1920 | Whitmore |
| 1,346,578 | A | 7/1920 | Windsor |
| 1,404,914 | A | 1/1922 | Winkle |
| 1,410,042 | A | 3/1922 | Watt |
| 1,469,667 | A | 10/1923 | Pleister |
| 1,516,347 | A | 11/1924 | Pataky |
| 1,621,598 | A | 3/1927 | Phillips |

(Continued)

FOREIGN PATENT DOCUMENTS

| | | |
|---|---|---|
| DE | 102011002031 | 10/2012 |
| EP | 2852765 | 2/2016 |
| JP | 11051018 | 2/1999 |

OTHER PUBLICATIONS

PCT International Search Report and written opinion, Application No. PCT/US2021/031779; dated Aug. 16, 2021, 8 pages.

(Continued)

*Primary Examiner* — Victor D Batson
*Assistant Examiner* — Dil K. Magar
(74) *Attorney, Agent, or Firm* — Dawsey Co., LPA; David J. Dawsey

(57) ABSTRACT

A reusable blind fastener including a bushing, a nut, a tail, a receiver, an expansion device, and a screw. The expansion device having an exterior surface that is discontinuous and configured for selective elastic deformation when engaging a portion of the screw.

20 Claims, 19 Drawing Sheets

(56) References Cited

U.S. PATENT DOCUMENTS

| | | |
|---|---|---|
| 1,808,318 A | 6/1931 | Pleister |
| 1,847,937 A | 3/1932 | Fetters |
| 2,296,470 A | 11/1942 | Keehn |
| 2,319,376 A | 5/1943 | Wallace |
| 2,365,372 A | 12/1944 | Allen |
| 2,435,876 A | 2/1948 | Swart |
| 2,469,349 A | 5/1949 | Zeidler |
| 2,570,003 A | 10/1951 | Palmer |
| 2,578,515 A | 12/1951 | Crafton |
| 2,632,354 A | 3/1953 | Black |
| 2,765,699 A | 10/1956 | Torre |
| 2,967,593 A | 1/1958 | Cushman |
| 2,832,254 A | 4/1958 | Viger et al. |
| 2,875,674 A | 3/1959 | Devine |
| 2,878,543 A | 3/1959 | Newcomer |
| 2,955,504 A | 10/1960 | Lovrinch, et al. |
| 3,019,865 A | 2/1962 | Rohe |
| 3,042,156 A | 7/1962 | Rohe |
| 3,078,002 A | 2/1963 | Rodgers |
| 3,082,657 A | 3/1963 | Fischer |
| 3,171,322 A | 3/1965 | Kaplan |
| 3,197,854 A | 8/1965 | Rohe et al. |
| 3,202,034 A | 8/1965 | Korenchan |
| 3,213,744 A | 10/1965 | Wagner |
| 3,241,591 A | 3/1966 | Rosan et al. |
| 3,267,793 A | 8/1966 | Devine |
| 3,279,303 A | 10/1966 | Shackelford et al. |
| 3,285,121 A | 11/1966 | Siebol |
| 3,285,311 A | 11/1966 | Cushman |
| 3,305,996 A | 2/1967 | Shapiro |
| 3,313,078 A | 4/1967 | Rohe |
| 3,339,609 A | 9/1967 | Cushman |
| 3,355,850 A | 12/1967 | Rohe |
| 3,373,648 A | 3/1968 | Pitzer |
| 3,384,142 A | 5/1968 | Phelan |
| 3,392,225 A | 7/1968 | Phelan |
| 3,434,262 A | 3/1969 | Lawrence |
| 3,443,473 A | 5/1969 | Tritt |
| 3,451,181 A | 6/1969 | Neuschotz |
| 3,455,201 A | 7/1969 | Ryder |
| 3,460,429 A | 8/1969 | Torre |
| 3,468,091 A | 9/1969 | Gerhard |
| 3,504,723 A | 4/1970 | Cushman et al. |
| 3,508,592 A | 4/1970 | Rosan et al. |
| 3,515,028 A | 6/1970 | Patton |
| 3,526,072 A | 9/1970 | Campbell |
| 3,579,942 A | 5/1971 | Cole |
| 3,621,557 A | 11/1971 | Cushman |
| 3,662,805 A | 5/1972 | Sygnator |
| 3,667,341 A | 6/1972 | Kaplan |
| 3,678,980 A | 7/1972 | Gutshall |
| 3,702,088 A | 11/1972 | Schmitt |
| 3,716,092 A | 2/1973 | Serewicz |
| 3,771,272 A | 11/1973 | Mihaly et al. |
| 3,861,268 A | 1/1975 | Jaggers |
| 3,884,006 A | 5/1975 | Dietlein |
| 3,977,146 A | 8/1976 | Wiley |
| 4,015,505 A | 4/1977 | Murray |
| 4,100,834 A | 7/1978 | Harris |
| 1,203,346 A | 5/1980 | Hall et al. |
| 4,269,106 A | 5/1981 | Leibhard et al. |
| 4,287,807 A | 9/1981 | Pacharis et al. |
| 4,296,586 A | 10/1981 | Heurteux |
| 4,330,230 A | 5/1982 | Giannuzzi |
| 4,405,272 A | 9/1983 | Wollar |
| 4,407,619 A | 10/1983 | Siebol |
| 4,428,705 A | 1/1984 | Gelhard |
| 4,516,378 A | 5/1985 | Fischer |
| 4,519,735 A | 5/1985 | Machtle |
| 4,537,541 A | 8/1985 | Giannuzzi |
| 4,688,977 A | 8/1987 | Seetaram |
| 4,702,654 A | 10/1987 | Frischmann et al. |
| 4,717,612 A | 1/1988 | Shackelford |
| 4,729,705 A | 3/1988 | Higgins |
| 1,752,169 A | 6/1988 | Pratt |
| 4,770,581 A | 9/1988 | Limbrick |
| 4,846,612 A | 7/1989 | Worthing |
| 4,981,735 A | 1/1991 | Rickson |
| 4,984,947 A | 1/1991 | Flauraud |
| 5,093,957 A | 3/1992 | Do |
| 5,125,778 A | 6/1992 | Sadri |
| 5,141,373 A | 8/1992 | Kendall |
| 5,147,167 A | 9/1992 | Berecz et al. |
| 5,176,481 A | 1/1993 | Schiefer |
| 5,178,502 A | 1/1993 | Sadri |
| 5,215,418 A | 6/1993 | Trainer et al. |
| 5,240,543 A | 8/1993 | Fetterhoff et al. |
| 5,259,689 A | 11/1993 | Arand et al. |
| 5,288,190 A | 2/1994 | Winkeljann et al. |
| 5,383,753 A | 1/1995 | Palm |
| 5,464,311 A | 11/1995 | Hiraguri et al. |
| 5,542,777 A | 8/1996 | Johnson |
| 5,544,992 A | 8/1996 | Ciobanu et al. |
| 5,603,592 A | 2/1997 | Sadri et al. |
| 5,651,649 A | 7/1997 | Sadri et al. |
| 5,685,663 A | 11/1997 | Sadri |
| 5,685,678 A | 11/1997 | Giannuzzi et al. |
| 5,707,190 A | 1/1998 | Hiraguri et al. |
| 5,716,177 A | 2/1998 | Schaffer |
| 5,810,530 A | 9/1998 | Travis |
| 5,865,581 A | 2/1999 | Sadri et al. |
| 5,941,668 A | 8/1999 | Kaibach et al. |
| 5,957,641 A | 9/1999 | Bogatz et al. |
| 6,027,292 A | 2/2000 | Raber |
| 6,055,790 A | 5/2000 | Lunde et al. |
| 6,065,918 A | 5/2000 | Adams |
| 6,077,012 A | 6/2000 | Granese et al. |
| 6,095,733 A | 8/2000 | Busby et al. |
| 6,149,363 A | 11/2000 | March |
| 6,233,802 B1 | 5/2001 | Fulbright |
| 6,234,734 B1 | 5/2001 | Klippel |
| 6,241,443 B1 | 6/2001 | Harbin et al. |
| 6,247,883 B1 | 6/2001 | Monserratt |
| 6,264,412 B1 | 7/2001 | Nakamura et al. |
| 6,270,303 B1 | 8/2001 | Gauthier et al. |
| 6,293,743 B1 | 9/2001 | Ernst et al. |
| 6,298,633 B1 | 10/2001 | McCorkle et al. |
| 6,309,158 B1 | 10/2001 | Bellinghausen et al. |
| 6,325,582 B1 | 12/2001 | Sadri et al. |
| 6,394,722 B1 | 5/2002 | Kunt et al. |
| 6,488,460 B1 | 12/2002 | Smith et al. |
| 6,524,045 B2 | 2/2003 | Pourtier |
| 6,551,040 B1 | 4/2003 | Terry et al. |
| 6,702,684 B2 | 3/2004 | Harbin et al. |
| 6,827,535 B2 | 12/2004 | Fuchs et al. |
| 6,868,757 B2 | 3/2005 | Hufnagl et al. |
| 6,874,985 B2 | 4/2005 | Hein et al. |
| 6,942,439 B2 | 9/2005 | Rouger |
| 7,025,550 B2 | 4/2006 | Monsenatt et al. |
| 7,033,120 B2 | 4/2006 | Hufnagl et al. |
| 7,150,595 B2 | 12/2006 | Liebig et al. |
| 7,195,436 B1 | 3/2007 | Stephen |
| 7,195,438 B2 | 3/2007 | Harbin et al. |
| 7,293,339 B2 | 11/2007 | Mercer et al. |
| 7,308,842 B2 | 12/2007 | Hufnagl et al. |
| 7,357,613 B2 | 4/2008 | Houck et al. |
| 7,857,564 B2 | 12/2010 | Wieser et al. |
| 7,891,151 B2 | 2/2011 | Sano |
| 7,891,924 B2 | 2/2011 | Mercer et al. |
| 7,896,598 B2 | 3/2011 | Mercer et al. |
| 7,921,530 B2 | 4/2011 | Mercer et al. |
| 8,002,506 B2 | 8/2011 | Pourtier et al. |
| 8,075,234 B2 | 12/2011 | McClure |
| 8,192,122 B2 | 6/2012 | Gaudron et al. |
| 8,393,124 B2 | 3/2013 | Zimmer et al. |
| 8,393,601 B2 | 3/2013 | de Mola |
| 8,409,395 B2 | 4/2013 | Schumacher, Jr. et al. |
| 8,434,983 B2 | 5/2013 | Chen |
| 8,444,355 B2 | 5/2013 | Gaudron et al. |
| 8,511,952 B2 | 8/2013 | Pratt |
| 8,640,428 B2 | 2/2014 | Naik et al. |
| 8,763,753 B2 | 7/2014 | Kray et al. |
| 8,784,024 B2 | 7/2014 | Lison et al. |
| 8,876,450 B1 | 11/2014 | Campau |

(56) References Cited

U.S. PATENT DOCUMENTS

| | | | |
|---|---|---|---|
| 8,950,159 B2 | 2/2015 | Cove et al. |
| 9,175,474 B2 | 11/2015 | May et al. |
| 9,441,660 B2 | 9/2016 | Meyers |
| 9,446,488 B2 | 9/2016 | Coronado |
| 9,457,540 B2 | 10/2016 | Lewis et al. |
| 9,611,877 B1 | 4/2017 | Attanasio |
| 9,682,529 B2 | 6/2017 | Schoke et al. |
| 9,803,668 B2 | 10/2017 | Reeves et al. |
| 9,822,808 B2 | 11/2017 | Rajeev |
| 9,874,306 B2 | 1/2018 | Burkhard et al. |
| 9,975,309 B2 | 5/2018 | Patel et al. |
| 9,976,583 B2 | 5/2018 | Lopez et al. |
| 9,981,446 B2 | 5/2018 | Holemans |
| 10,016,955 B2 | 7/2018 | Mills |
| 10,018,209 B2 | 7/2018 | Burd et al. |
| 1,099,767 A1 | 10/2018 | Lewis et al. |
| 10,092,986 B2 | 10/2018 | Coronado |
| 10,190,617 B2 | 1/2019 | Anasis et al. |
| 10,197,078 B2 | 2/2019 | Richardson et al. |
| 10,228,003 B2 | 3/2019 | Nipper et al. |
| 10,228,684 B2 | 3/2019 | Coon et al. |
| 10,309,434 B2 | 6/2019 | Kleshchev et al. |
| 10,400,804 B2 | 9/2019 | Cheynet De Beaupre et al. |
| 10,487,864 B2 | 11/2019 | Schmidt et al. |
| 10,514,053 B2 | 12/2019 | Holzinger et al. |
| 10,730,604 B2 | 8/2020 | Lewis et al. |
| 2002/0054805 A1 | 5/2002 | Kaibach et al. |
| 2003/0108398 A1 | 6/2003 | Sathianathan |
| 2003/0123948 A1 | 7/2003 | Fuchs et al. |
| 2005/0155305 A1 | 7/2005 | Cosenza et al. |
| 2005/0281633 A1 | 12/2005 | Mercer |
| 2006/0078399 A1 | 4/2006 | Coddington et al. |
| 2006/0090321 A1 | 5/2006 | Haines, Jr. |
| 2006/0182514 A1 | 8/2006 | Ito |
| 2006/0219649 A1 | 10/2006 | Wolfford, Sr. |
| 2007/0098518 A1 | 5/2007 | Rosenkranz |
| 2011/0047770 A1 | 3/2011 | Mercer et al. |
| 2011/0057398 A1 | 3/2011 | Mercer et al. |
| 2012/0311947 A1 | 12/2012 | Van Wissen |

OTHER PUBLICATIONS

Lindapter International, Hollow-Bolt® by Lindapter® catalog, published at least as early as Dec. 31, 2012, United States.
Alcoa Fastening Systems, Huck Bom® catalog, published at least as early as May 22, 2013, United States.
LNA Solutions—A Kee Safey Company, Steel Connection Solutions catalog. Box Bolt® product information, pp. 6-11, published at least as early as Dec. 31, 2012, United States.
All Fasteners, Tower Products Catalog—Edition 2, published at least as early as Jul. 31, 2013, United States.
International Search Report and Written Opinion of the International Searching Authority for International Application No. PCT/US2015/043711, dated Oct. 23, 2015, nine pages.

BLIND FASTENER

CROSS-REFERENCE TO RELATED APPLICATIONS

This application claims the benefit of U.S. provisional patent application Ser. No. 63/023,519, filed on May 12, 2020, all of which are incorporated by reference as if completely written herein.

STATEMENT REGARDING FEDERALLY SPONSORED RESEARCH OR DEVELOPMENT

Not applicable.

TECHNICAL FIELD OF THE INVENTION

The present invention relates generally to reusable blind fasteners.

BACKGROUND OF THE INVENTION

Blind fasteners have historically been permanent one-time use fasteners that utilize permanent deformation of a component of the fastener. The field has needed a reusable blind fastener that relies on repeatable plastic deformation of a component of the fastener to create a strong non-permanent joint.

SUMMARY OF THE INVENTION

A reusable blind fastener including a bushing, a nut, a tail, a receiver, an expansion device, and a screw. The expansion device having an exterior surface that is discontinuous and configured for selective elastic deformation when engaging a portion of the screw.

BRIEF DESCRIPTION OF THE DRAWINGS

Without limiting the scope of the present invention as claimed below and referring now to the drawings and figures:

Figure 1:
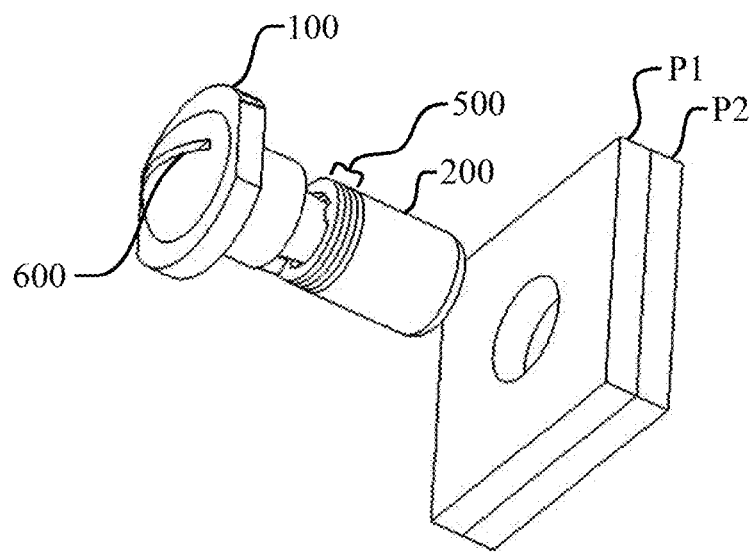
FIG. 1 is a perspective view of an embodiment of a blind fastener.

These illustrations are provided to assist in the understanding of the exemplary embodiments of blind fasteners as described in more detail below and should not be construed as unduly limiting the specification. In particular, the relative spacing, positioning, sizing and dimensions of the various elements illustrated in the drawings may not be drawn to scale and may have been exaggerated, reduced or otherwise modified for the purpose of improved clarity. Those of ordinary skill in the art will also appreciate that a range of alternative configurations have been omitted simply to improve the clarity and reduce the number of drawings.

DETAILED DESCRIPTION OF THE INVENTION

As seen in FIGS. 1-15, various embodiments of a blind fastener may include a bushing (100), a nut (200), a tail (300), a receiver (400), an expansion device (500), and/or a screw (600). The blind fastener is designed to releasably interlock at least a first panel (P1) and a second panel (P2), with the first panel (P1) having a first panel bore (P1B) and the second panel (P2) having a second panel bore (P2B). The blind fastener is designed to work on curved panels as well as flat panels, but flat panels are illustrated for simplicity.

Figure 2:
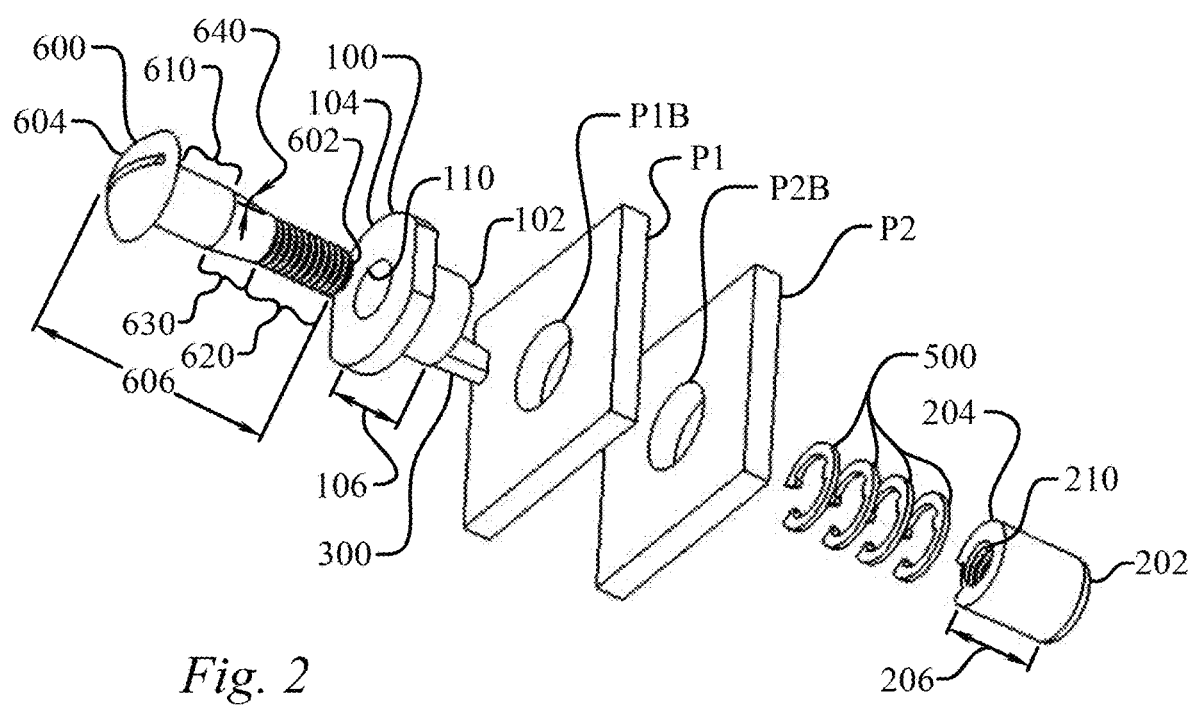
FIG. 2 is an exploded view of an embodiment of a blind fastener.
Figure 4:
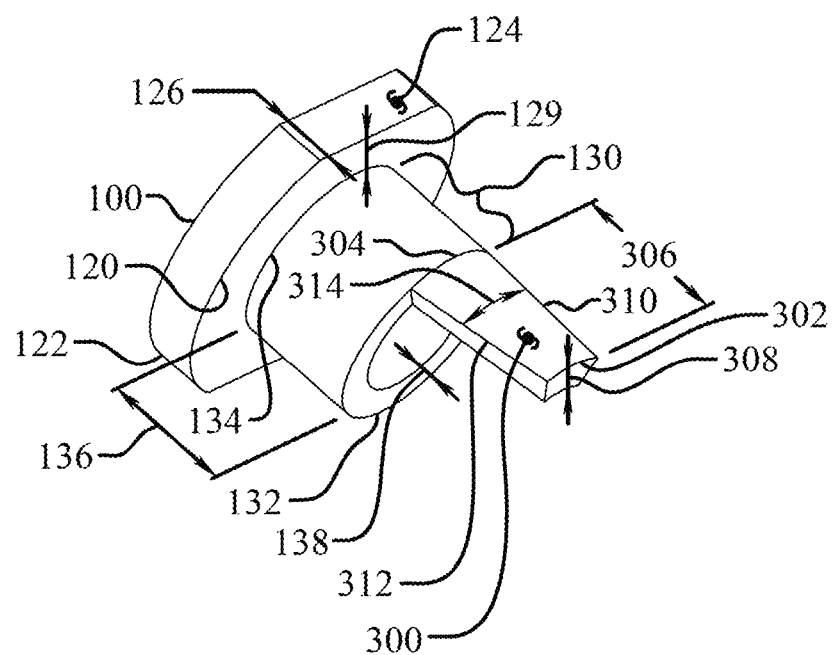
FIG. 4 is a perspective view of some components of an embodiment of a blind fastener.
Figure 13:
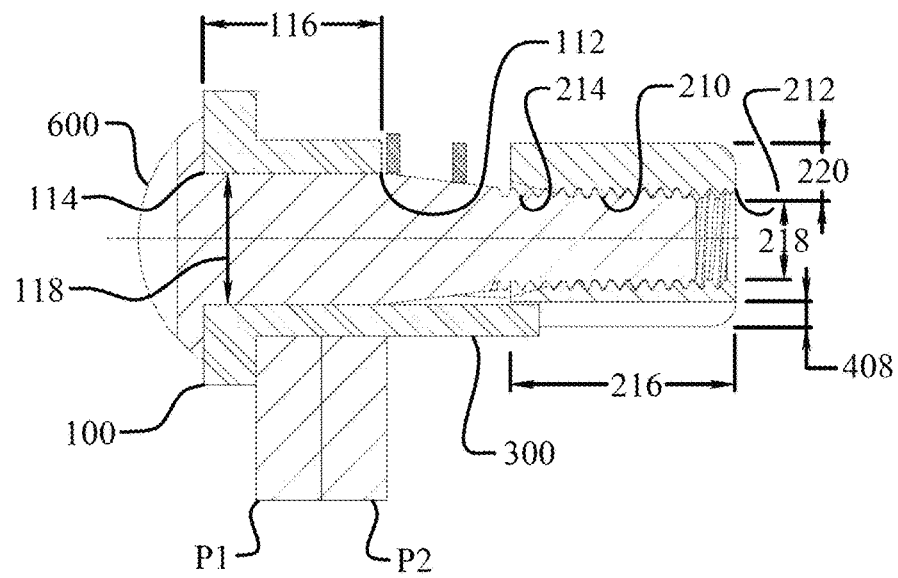
FIG. 13 is a cross-section taken along section line 13-13 in FIG. 10.

With reference specifically to FIGS. 1 & 2, the bushing (100) has bushing distal end (102), a bushing proximal end (104), and a bushing length (106) between the bushing distal end (102) and the a bushing proximal end (104). Further, the bushing (100) may include a bushing head (120), designed to remain outside of the first panel bore (P1B), and a bushing insert portion (130), designed to enter at least the first panel bore (P1B), and preferably also the second panel bore (P2B). With reference now to FIG. 4, the bushing head (120) has a bushing head thickness (126), a bushing head perimeter (122), which may include at least one bushing head gripping surface (124), a bushing head max dimension (128), seen in FIG. 10, and a minimum head flange dimension (129), seen in FIGS. 4 & 8. With reference again to FIG. 4, the bushing insert portion (130) has an insert distal end (132), an insert proximal end (134), an insert length (136), and an insert wall thickness (138). The bushing (100) has a bushing bore (110), seen in FIG. 2, that is a passageway through the bushing (100) from the bushing distal end (102) to the bushing proximal end (104). As seen in FIG. 13, the bushing bore (110) has a bushing bore distal end (112), a bushing bore proximal end (114), a bushing bore length (116) between the bushing bore distal end (112) and the a bushing bore proximal end (114), and a bushing bore diameter (118).

With reference now to FIG. 2, the nut (200) has a nut distal end (202), a nut proximal end (204), and a nut length (206) from the nut distal end (202) to the nut proximal end (204). As seen in FIG. 13, the nut (200) may include a nut bore (210) having a nut bore distal end (212), a nut bore proximal end (214), and a nut bore length (216) between the nut bore distal end (212) and the nut bore proximal end (214). Further, the nut (200) has a nut bore diameter (218) and a nut wall thickness (218).

Now attributes of the tail (300) and receiver (400) will be disclosed in detail. The tail (300) may be formed with, or attached to, the bushing (100) as seen in FIGS. 1-14, however the tail (300) may alternatively be formed with, or attached to, the nut (200). Similarly, the receiver (400) may be formed in the nut (200) as seen in FIGS. 1-14, however the receiver (400) may alternatively be formed in the bushing (100). With reference now to FIG. 6, the tail (300) has a tail distal end (302), a tail proximal end (304), a tail length (306) between the tail distal end (302) and the a tail proximal end (304), a tail thickness (308), a tail dextral wall (310), a tail sinistral wall (312), and a tail width (314) measured along the exterior surface of the tail (300) in a direction perpendicular to the longitudinal axis of the bushing bore (110). The tail dextral wall (310) and the tail sinistral wall (312) may converge toward one another at an angle referred to as a tail taper (316), seen in FIG. 14, and imaginary lines extending from the tail dextral wall (310) and the tail sinistral wall (312) would converge to a tail convergence point (313), which in an embodiment is located beyond the nut distal end (202).

Figure 5:
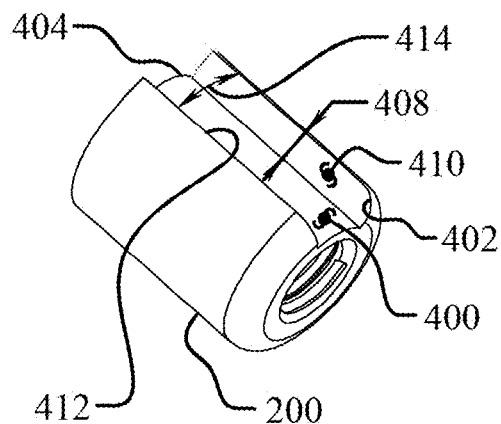
FIG. 5 is a perspective view of some components of an embodiment of a blind fastener.
Figure 6:
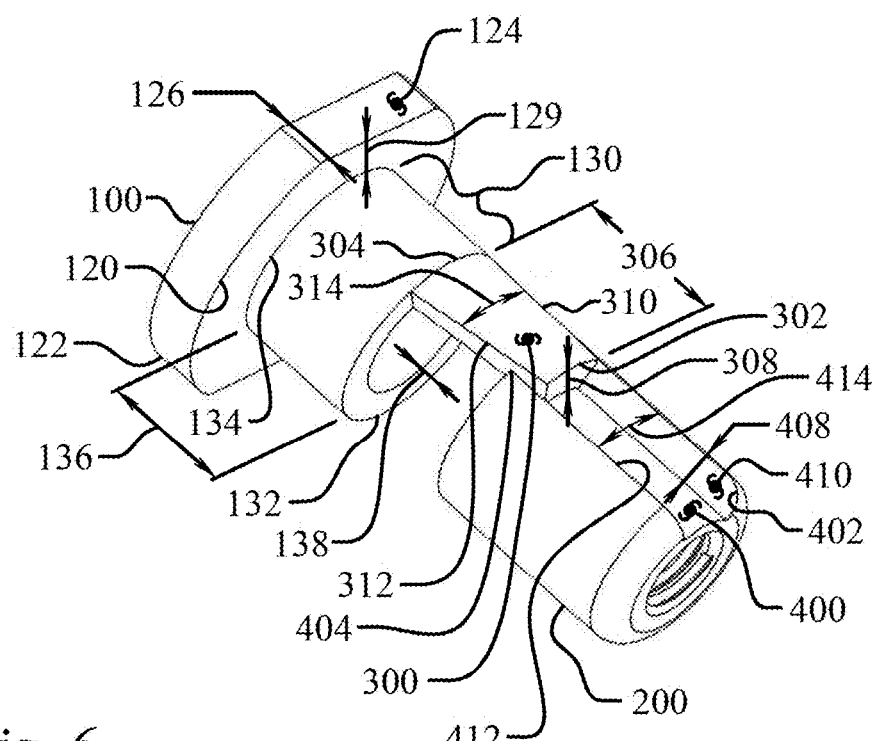
FIG. 6 is a perspective view of some components of an embodiment of a blind fastener.
Figure 14:
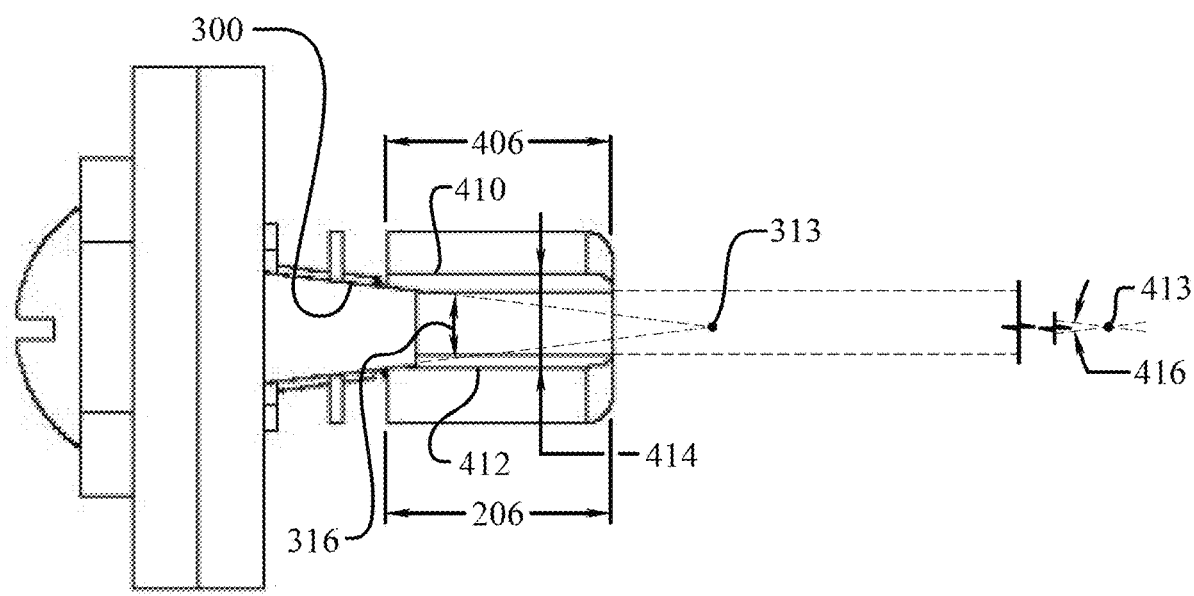
FIG. 14 is an elevation view of an embodiment of a blind fastener.

Referring again to FIG. 6, the receiver (400) has a receiver distal end (402), a receiver proximal end (404), a receiver length (406) as seen in FIG. 14, and a receiver depth (408) as seen in FIGS. 5, 6, and 13. The receiver (400) may be formed to create a receiver dextral wall (410) and a receiver sinistral wall (412), as seen in FIG. 14, which may be parallel or converge to an imaginary receiver convergence point (413), and having a receiver width (414), being the shortest distance between the receiver dextral wall (410) and the receiver sinistral wall (412) in a direction perpendicular to a longitudinal axis of the nut bore (210). The receiver dextral wall (410) and the receiver sinistral wall (412) may be parallel or converge toward one another at an angle referred to as a receiver taper (416), seen in FIG. 14, and imaginary lines extending from the receiver dextral wall (410) and the receiver sinistral wall (412) would converge to the receiver convergence point (413). In converging embodiments the receiver taper (416) is less than the tail taper (316), and in one embodiment the receiver taper (416) is at least 10% less than the tail taper (316), and at least 20% less in another embodiment, and at least 30% less in still a further embodiment.

Figure 15:
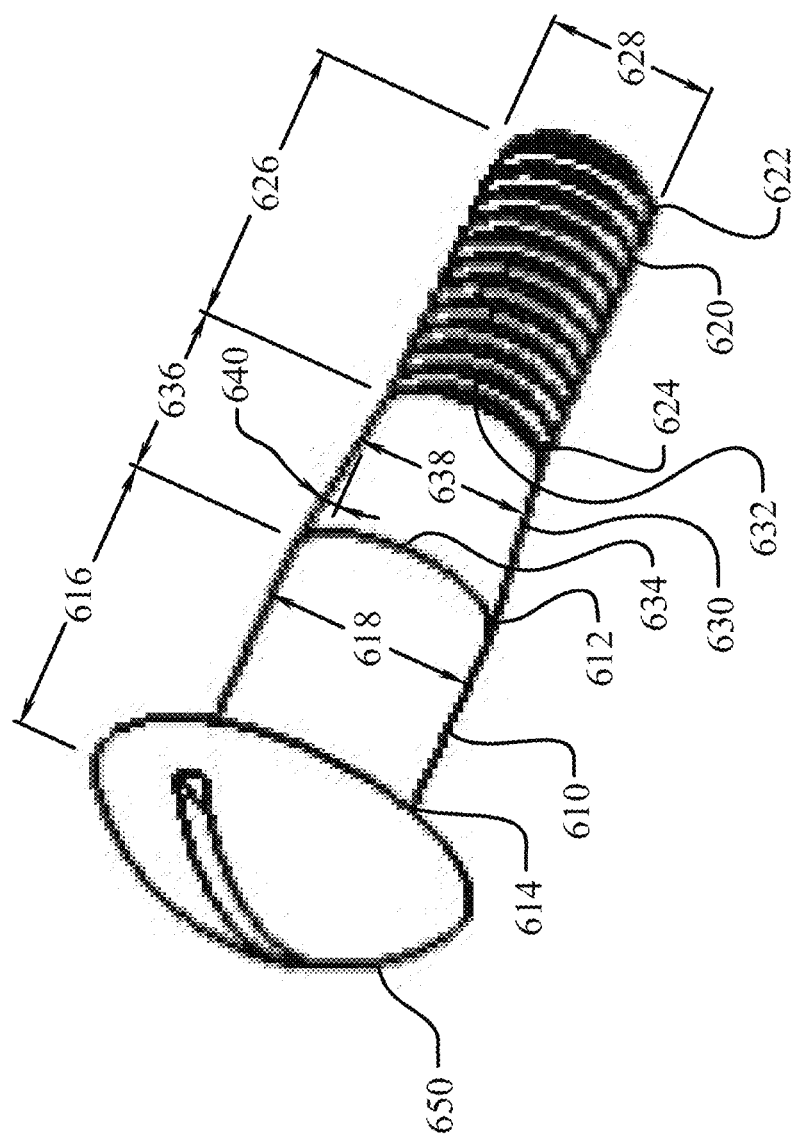
FIG. 15 is a perspective view of some components of an embodiment of a blind fastener.

Next, with reference again to FIG. 2, the screw (600) has a screw distal end (602), a screw proximal end (604), and a screw length (606) between the screw distal end (602) and the screw proximal end (604). As seen in FIG. 15, the screw (600) may include a shank (610), a threaded portion (620), a transition (630), and/or a screw head (650). The shank (610) includes a shank distal end (612), a shank proximal end (614), a shank length (616) from the shank distal end (612) to the shank proximal end (614), and a shank cross-sectional dimension (618), which in the case of a round cross-section is a shank diameter. Similarly the threaded portion (620) has a threaded portion distal end (622), a threaded portion proximal end (624), a threaded portion length (626) from the threaded portion distal end (622) to the threaded portion proximal end (624), and a threaded portion cross-sectional dimension (628), which in the case of a round cross-section is a threaded portion diameter. Further, the transition (630) has a transition portion distal end (632), a transition portion proximal end (634), a transition portion length (636) between the transition portion distal end (632) and the transition portion proximal end (634), a transition portion cross-sectional dimension (638), which in the case of a round cross-section is a transition diameter, and a transition angle (640), seen in FIG. 2, which is an angle of an exterior surface of the transition (630) measured from a longitudinal axis of the screw (600). The transition (630) does not need to extend a full 360 degrees around the screw (600), but may consist of multiple transition portions separated by regions of a size approximately equal to the threaded portion cross-sectional dimension (628).

Figure 7:
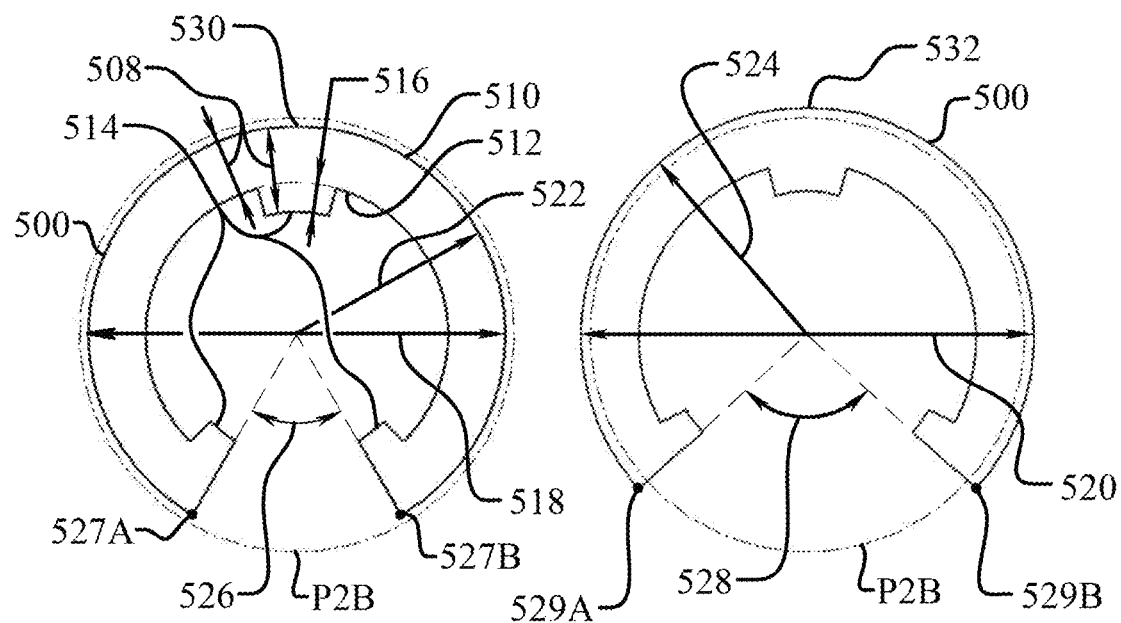
FIG. 7 is an elevation view of an embodiment of an expansion device in two different states.
Figure 8:
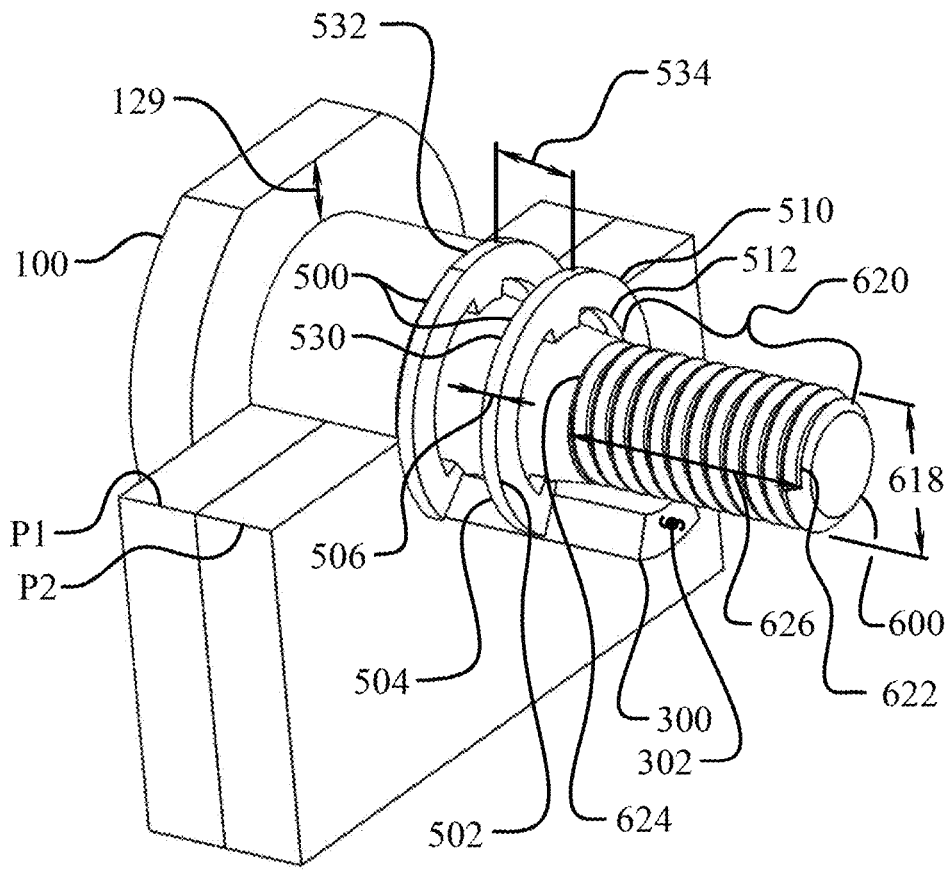
FIG. 8 is a perspective view of some components of an embodiment of a blind fastener.
Figures 9, 10:
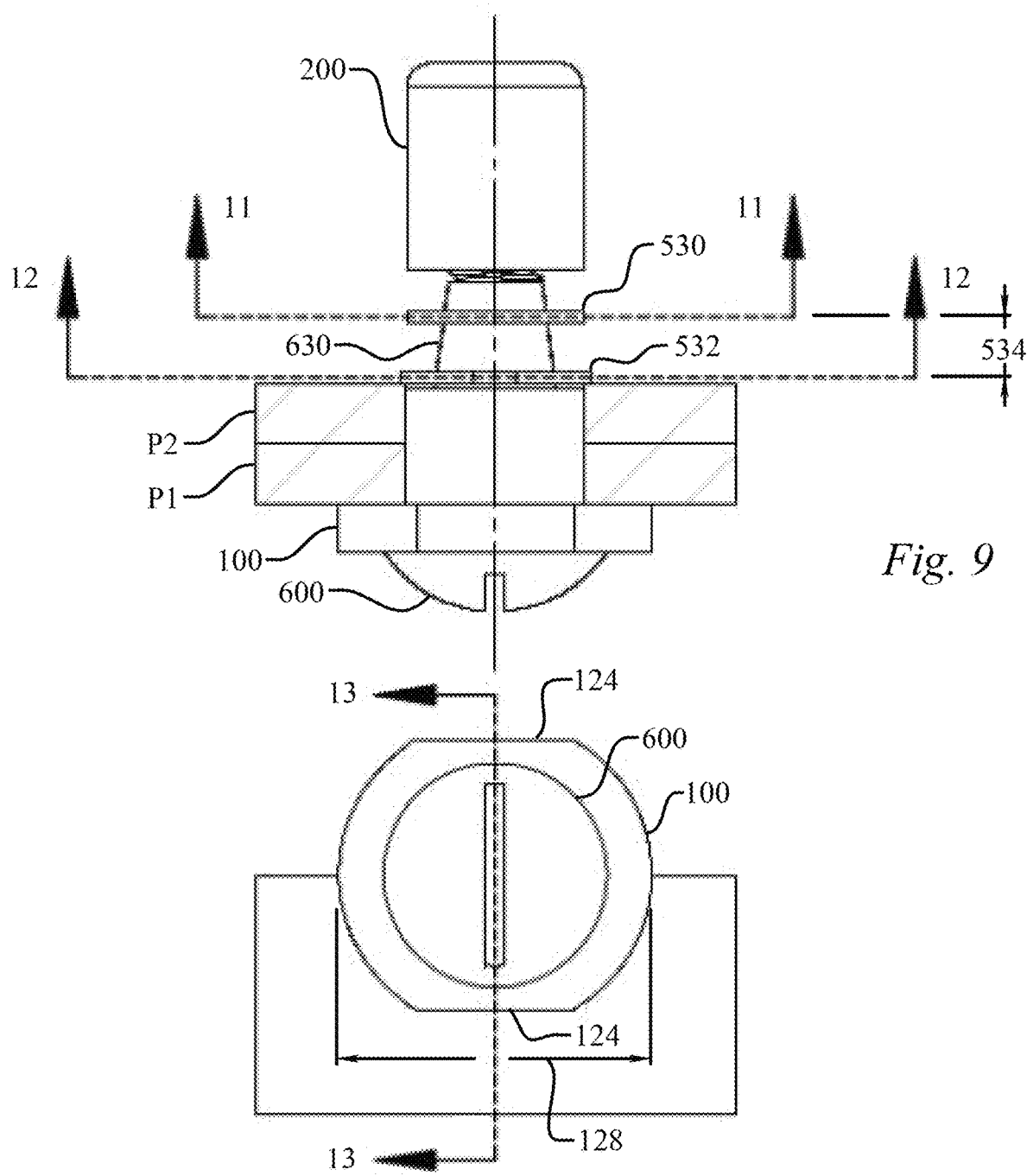
FIG. 9 is a partial sectional view of an embodiment of a blind fastener.
FIG. 10 is an elevation view of an embodiment of a blind fastener.
Figure 11:
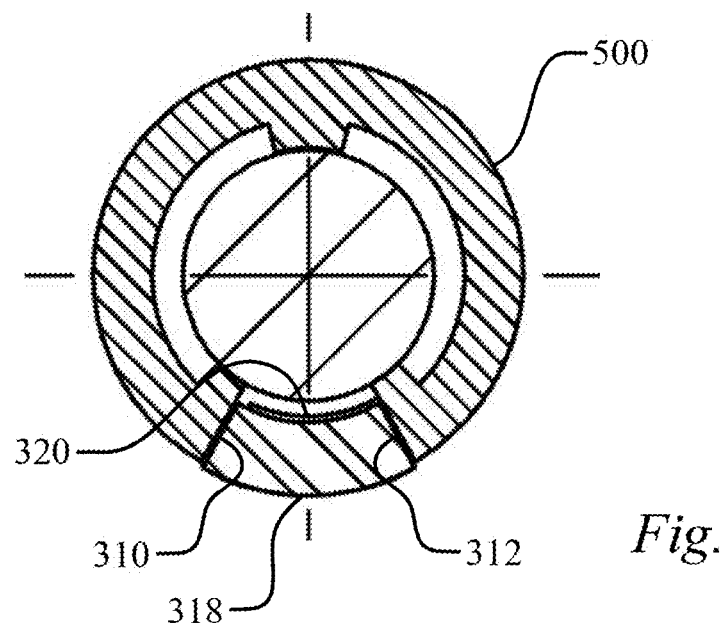
FIG. 11 is a cross-section taken along section line 11-11 in FIG. 9.
Figure 12:
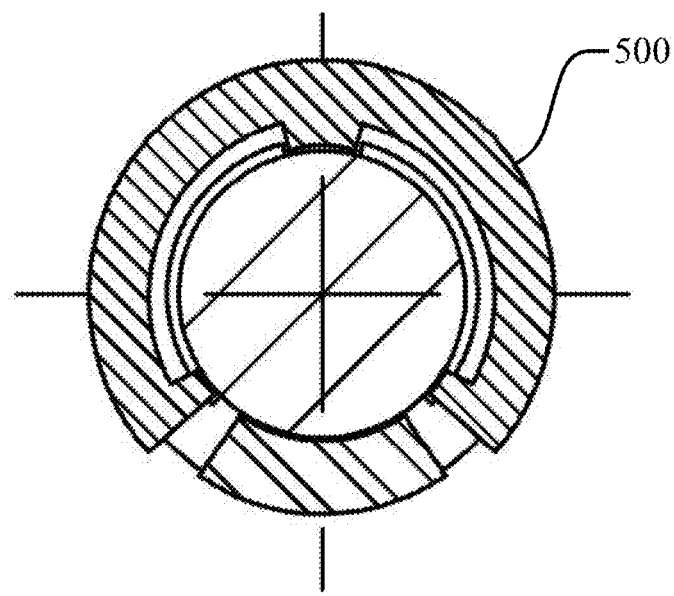
FIG. 12 is a cross-section taken along section line 12-12 in FIG. 9.

Now with the basic structure of majority of the components disclosed it is helpful to refer again to FIGS. 1 & 2 to appreciate the organization of the components. As seen in FIG. 2, the screw (600) extends through the bushing (100) via the bushing bore (110). In this embodiment neither the shank (610) or the bushing bore (110) are threaded. Then at least one expansion device (500) is received over the screw distal end (602) until the expansion device (500) contacts the transition portion (630), as seen in FIG. 8. Finally, the nut (200), specifically the nut bore (210), engages the screw threaded portion (620). The blind fastener assembly, seen in FIG. 1, may then be inserted into the bores of the first panel (P1B) and the second panel (P2B), to the position illustrated in FIG. 3. Then, without any access to the region beyond the second panel (P2B), a user, or the geometry of the bore(s), may hold the bushing (100) to prevent its rotation as the screw (600) is rotated and thereby draws the nut (200) toward the bushing (100) and resulting in the expansion device (500) moving from the ED first position (530) to the ED second position (532), as seen in FIGS. 8 & 9, thereby moving an ED translation distance (534). The movement of the expansion device (500) elastically deforms the expansion device (500) so that it is larger than at least one of the first panel bore (P1B) or second panel bore (P2B), as seen in FIGS. 7 & 8, thereby preventing the blind fastener from being removed.

Now with that introduction complete a more comprehensive disclosure of the expansion device (500) is in order to then appreciate the role of the tail (300), the receiver (400), the screw transition (630), and how aspects of all these components interact and relate to one another to ensure smooth and reliable operation of the assembly, as well as the repeated and reliable engagement and disengagement of the blind fastener. Referring again to FIGS. 7 & 8, the expansion device (500) has an ED distal wall (502), an ED proximal wall (504), an ED length (506) from the ED distal wall (502) to the ED proximal wall (504), an ED exterior surface (510), an ED interior surface (512), an ED thickness (508) from the ED exterior surface (510) to the ED interior surface (512). The left side of FIG. 7 illustrates the initial state of the expansion device (500), before any deformation has taken place, such as in the ED first position (530) of FIG. 8. In this position the expansion device (500) has an ED initial max dimension (518), which is an ED initial diameter when the expansion device (500) is round, and also leads to an ED initial exterior surface radius (522). The right side of FIG. 7 illustrates the expanded state of the expansion device (500), after deformation has taken place, such as in the ED second position (532) of FIG. 8. The deformation may be elastic, as explained later in detail, thereby providing a reusable blind fastener. In this position the expansion device (500) has an ED expanded max dimension (520), which is an ED expanded diameter when the expansion device (500) is round, and also leads to an ED expanded exterior surface radius (524). Just as the screw transition (630) need not have a circular cross-section, the expansion device (500) need not be round.

In one embodiment the expansion device (500) does not enclose the screw transition (630) in the initial state, or ED first position (530); thus in a round embodiment it does not encircle the screw transition (630) a complete 360 degrees. Rather, in an embodiment the expansion device (500) has a discontinuous ED exterior surface (510) with an initial sinistral gap opening point (527A) and an initial dextral gap opening point (527B), as seen on the left of FIG. 7. In round embodiments, such as those illustrated, the expansion device (500) has an initial center point established by the center of the constant curvature of the ED exterior surface (510). Imaginary lines extending from the initial center point to the initial sinistral gap opening point (527A) and the initial dextral gap opening point (527B) then define an ED initial exterior surface gap angle (526). In the illustrated embodiments end walls of the expansion device (500) align with the imaginary lines defining the ED initial exterior surface gap angle (526), but this is not required and the end walls need not be substantially perpendicular to the ED exterior surface (510) at the initial sinistral gap opening point (527A) and the initial dextral gap opening point (527B).

For instance in another embodiment the angles between the end walls and the ED exterior surface (510) are obtuse and cooperate with undercut sides of the tail (300). Not shown but easily understood with reference to FIG. 11, undercut sides mean the angle between a tail exterior surface (318) and the tail dextral wall (310) is acute, and/or the angle between the tail exterior surface (318) and the tail sinistral wall (312) is acute. A further embodiment has obtuse angles between a tail interior surface (320) and the tail dextral wall (310) and/or the tail sinistral wall (312). Such undercut embodiments enhance the sliding engagement of at least a portion of the tail (300) and the expansion device (500) to further enhance the durability of the assembly. Similarly, the receiver dextral wall (410) and/or the receiver sinistral wall (412), seen in FIG. 14, may be angled with respect to the nut exterior surface to cooperate with the undercut sides of the tail (300).

Now referring back to the embodiment of FIG. 7, the right side of the figure illustrates the expanded state, or ED second position (532). In this embodiment the expansion device (500) has a discontinuous ED exterior surface (510) with an expanded sinistral gap opening point (529A) and an expanded dextral gap opening point (529B). In round embodiments, such as those illustrated, the expansion device (500) has an expanded center point established by the center of the constant curvature of the ED exterior surface (510). In one embodiment the expanded center point coincides with the initial center point. Imaginary lines extending from the expanded center point to the expanded sinistral gap opening point (529A) and the expanded dextral gap opening point (529B) then define an ED expanded exterior surface gap angle (528). Again, in the illustrated embodiments end walls of the expansion device (500) align with the imaginary lines defining the ED expanded exterior surface gap angle (528), but this is not required and the end walls need not be substantially perpendicular to the ED exterior surface (510) at the expanded sinistral gap opening point (529A) and the expanded dextral gap opening point (529B).

As the expansion device (500) is forced by the nut (300) from the ED first position (530) to the ED second position (532), the engagement of at least a portion of the ED interior surface (512) with the transition (630) produces the deformation and expansion of the expansion device (500). The tail (300) cooperates with the receiver (400) to prevent the nut (200) from rotating as a user turns the screw (600) to draw the nut (200) toward the bushing (100) and forcing the engagement of the expansion device (500) with the transition (630). Some embodiments reduce the friction associated with this engagement through the use of an ED contact surface (514), which reduces the contact area by at least 50%, which in embodiments having a constant ED length (506), seen in FIG. 8, equates to the reducing the length of the ED interior surface (512) that is in contact with the transition (630) by at least 50%. In one embodiment the contact area, and the contact length, is less than 30% of the area of the ED interior surface (512). Further, the ED contact surface (514) is offset from the ED interior surface (512) by an ED contact surface height (516), as seen on the left side of FIG. 7, which in one embodiment is at least 50% of the ED length (506), and at least 100% in another embodiment, while no more than 500% in yet a further embodiment. The ED contact surface height (516) is preferably no more than an average ED thickness (508) for the entire expansion device (500), and in one embodiment it is no more than 75% of the average ED thickness (508) for the entire expansion device (500), while in still a further embodiment it is at least 25% of the average ED thickness (508) for the entire expansion device (500).

Another embodiment includes at least three distinct and separate ED contact surfaces (514), as seen in FIG. 7, which in a further embodiment includes one adjacent the initial sinistral gap opening point (527A) and a second adjacent the initial dextral gap opening point (527B), while in still another embodiment the third is equidistant from the first and second contact surfaces (514). In a still further embodiment the length of each contact surface (514) is greater than the ED length (506), and at least 50% greater in another embodiment, and preferably no more than 500% greater in another embodiment. In fact, in one embodiment the total contact length of all contact surfaces (514) is no more than 15 times the ED length (506), and no more than 12.5 times in another embodiment, and no more than 10 times in still a further embodiment.

The transition (630) may be formed with one or more channels, not shown but easily understood with respect to FIGS. 7 and 8, designed to receive and cooperate with the expansion device (500), and more specifically the one or more contact surfaces (514). Further, another embodiment incorporates two such channels in the transition (630), for example—one for the lower left contact surface (514) of FIG. 7 and one for the lower right contact surface (514). In such an embodiment the channels may be nonparallel so as to assist in the expansion of the gap angle as the expansion device (500) is advanced along the transition (630). Even further the transition (630) may include another channel for the upper central contact surface (514) of FIG. 7, one that is nonparallel to the other channels but in some embodiments parallel to the longitudinal axis of the screw (600). In any of these channel embodiments, the channel has a depth that is preferably less than the ED contact surface height (516), and at least 20% less than the ED contact surface height (516) in another embodiment, and at least 40% less in still a further embodiment. Similarly, in any of these channel embodiments the channel has a width that cooperates with the size and shape of the contact surface (514) and therefore is within 20% of any of the disclosure associated with the contact surface (514). Alternatively, one skilled in the art will appreciate that the aforementioned channel(s) may be formed in the expansion device (500), rather than the transition (630), and the projections, aka contact surface(s) (514), may extend from the transition (630); and all the associated disclosure and relationships apply equally to such embodiments.

As with all the relationships disclosed herein, these relationships are more than mere optimization, maximization, or minimization of a single characteristic or variable, and are often contrary to conventional design thinking yet have been found to achieve a unique balance of the trade-offs associated with competing criteria such as durability, weight, and ease of use. The aforementioned balance requires trade-offs among the competing characteristics recognizing key points of diminishing returns. Most blind fasteners utilize permanent deformation and therefore may only be used once. In a reusable blind fastener, proper functioning of each component on each and every engagement can be a matter of life or death. Therefore, this disclosure contains a unique combination of components and relationships that produce reliable and uniform deformation of the expansion device (500), that is adverse to fatigue and stress concentration failures, so that the expansion device (500) properly engages the back side of the second panel (P2) without the risk of being drawn into the second panel bore (P2B), while also automatically deforming back to a size that will pass through the second panel bore (P2B) simply by movement of the nut (200) toward the screw distal end (602). While the relationships of the various features and dimensions of a single component such as the expansion device (500) play an essential role in achieving the goals, the relationships of features across multiple components are just as critical, if not more critical, to achieving the goals, as will now be disclosed in detail.

For instance, with reference to FIG. 7, in one embodiment the ED expanded exterior surface gap angle (528) is at least 20% greater than the ED initial exterior surface gap angle (526), and at least 40% greater, at least 60% greater, and at least 80% greater in further embodiments. However, the increase in gap angle has a limit before significantly reducing the durability and fatigue characteristics of the expansion device (500). Specifically in one embodiment the ED expanded exterior surface gap angle (528) is no more than 200% greater than the ED initial exterior surface gap angle (526), and no more than 170% greater, no more than 140% greater, and no more than 110% greater in still further embodiments.

Additionally, the ED initial exterior surface gap angle (526) is less than 75 degrees in one particular embodiment, and less than 65, 55, and 50 degrees in further embodiments. In another embodiment the ED initial exterior surface gap angle (526) is at least 15 degrees, and at least 25, 35, and 40 degrees in still additional embodiments. Similarly, the ED expanded exterior surface gap angle (528) is less than 135 degrees in one particular embodiment, and less than 120, 105, and 90 degrees in further embodiments. In another embodiment the ED expanded exterior surface gap angle (528) is at least 45 degrees, and at least 60, 75, and 80 degrees in still additional embodiments.

In another embodiment every 10 degree increase in the angle from the ED initial exterior surface gap angle (526) to the ED expanded exterior surface gap angle (528) results in at least a 1% increase of the ED initial max dimension (518) to the ED expanded max dimension (520), and at least a 1.5% increase, 2.0% increase, and 2.5% increase in further embodiments. However simply maximizing the increase in the ED expanded max dimension (520) negatively impacts the reliability and durability of the blind fastener, therefore in another embodiment every 10 degree increase in the angle from the ED initial exterior surface gap angle (526) to the ED expanded exterior surface gap angle (528) results in no more than a 5% increase of the ED initial max dimension (518) to the ED expanded max dimension (520), and no more than a 4.5% increase, 4% increase, and 3.5% increase in further embodiments.

Achievement of the goals of the blind fastener, as well as the disclosed relationships, is influenced in part by the placement of the transition (630), the transition portion length (636), and the transition angle (640), as seen in FIG. 15. In one embodiment the transition angle (640) is at least 3.5 degrees, and at least 5.0, 6.5, and 7.0 degrees in further embodiments. Additional embodiments recognize the diminishing returns and negative implications of an aggressive transition angle (640) and therefore limit it to no more than 12.0 degrees, and no more than 10.5, 9.0, and 7.5 degrees in additional embodiments. In still another embodiment the transition portion length (636) is no greater than any, or all, of the following: the shank length (616), the threaded portion length (626), the tail length (306), the bushing length (106), the bushing insert length (136), and/or the nut length (206).

Additionally, the relative length, width, and thickness of various components, and their relationships to one another and the other design variables disclosed herein, influence the durability, ease of use, and reusability of the blind fastener. Even further embodiments have a tail length (306) that is at least 75% of the bushing insert length (136), and at least 85%, 95%, and 100% in additional embodiments. Further embodiments have identified upper limits on this relationship beyond which the design, durability, and usability suffer. In another embodiment the tail length (306) is no more than 150% of the bushing insert length (136), and no more than 140%, and no more than 130% in additional embodiments. Similarly, in another embodiment the tail taper (316), seen best in FIG. 14, is at least 7 degrees, and at least 10 degrees, at least 13 degrees, and at least 14 degrees in additional embodiments. Once again an additional series of embodiments identifies the range at which the cons of an aggressive taper outweigh the benefits, and as such the tail taper (316) is no more than 24 degrees, and no more than 21 degrees, 18 degrees, and 15 degrees in more embodiments.

Likewise, in a further embodiment the tail width (314), seen in FIG. 6 and measured along the exterior surface of the tail (300) from the tail dextral wall (310) to the tail sinistral wall (312) and taking into account the curvature when curved, is at least 25% of the bushing bore diameter (118), as is at least 40%, and 50% in further embodiments. In another series of embodiments the tail width (314) is no more than 90% of the bushing bore diameter (118), and no more than 80%, 70%, and 60% in still more embodiment. Another embodiment balances the needs associated with prevention of nut (200) rotation and the reliability and durability of the expansion device (500) by having a tail width (314) that is no greater than 70% of the ED initial max dimension (518), and no greater than 60%, and no greater than 50% in further embodiments. Nonetheless, other embodiments introduce a floor for the tail width (314), namely a tail width (314) that is at least 15% of the ED initial max dimension (518), and at least 25%, and 35% in additional embodiments. The screw length (606) is at least twice the bushing length (106), and the screw length is at least 50% greater than the nut length (206); while in a further embodiment the screw length (606) is no more than 6 times the bushing length (106), and no more than 4 times the nut length (206). Further, the threaded portion length (626) is greater than the bushing length (106) in an embodiment, and is at least 50% greater than the transition length (636) in another embodiment. Additionally, in another embodiment the shank cross-sectional dimension (618) is at least 20% greater than the threaded portion cross-sectional dimension (628), and at least 25% greater, and at least 30% greater in additional embodiments. A further series of embodiments introduces upper limits on this relationship with the shank cross-sectional dimension (618) being no more than 60% greater than the threaded portion cross-sectional dimension (628), and no more than 50%, and no more than 40% in additional embodiments.

Another relationship associated with the bushing bore diameter (118) is the minimum head flange dimension (129) seen in FIG. 6. In one embodiment the minimum head flange dimension (129) is at least 25% of the bushing bore diameter (118), while in additional embodiments it is at least 30%, and at least 35%. Nonetheless, further embodiments limit the scale of the minimum head flange dimension (129) to be no more than 60% of the bushing bore diameter (118), and no more than 50%, and no more than 40% in further embodiments. Another significant relationship including the minimum head flange dimension (129) is associated with the difference between the ED expanded max dimension (520) and the ED initial max dimension (518), which in one embodiment is at least 10% of the minimum head flange dimension (129), and at least 20%, and at least 30% in additional embodiments. Further, another series of embodiments sets an upper boundary on this relationship to balance durability and usability with safety, namely the difference between the ED expanded max dimension (520) and the ED initial max dimension (518) is no more than 80% of the minimum head flange dimension (129), and no more than 70%, 60%, and 50% in still additional embodiments.

With continued reference to FIG. 7, the ED interior surface (512), or the ED contact surface(s) (514) when present, establish an ED max interior dimension, not shown, that is the largest diameter of an object passing through the expansion device (500) without causing deformation. The threaded portion cross-sectional dimension (628) is less than the ED max interior dimension, and in a further embodiment the minimum transition portion cross-sectional dimension (638), seen in FIG. 15, is less than the ED max interior dimension so that the expansion device (500) is not stressed, or deformed, at the ED first position (530). In fact in one embodiment transition portion cross-sectional dimension (638) and transition angle (640) are configured such that the expansion device (500) does not begin deformation until it is at least 5% of the way into the transition portion length (636), and at least 10% in another embodiment, and at least 15% in a further embodiment. However, to avoid rapid enlargement of the expansion device (500) deformation should begin by a point 50% of the way into the transition portion length (636), and 40% in another embodiment, and 30% in still a further embodiment.

The nut proximal end (204), seen in FIG. 2, may extend beyond the nut bore proximal end (214), seen in FIG. 13, so that nut proximal end (204) may extend at least 50% of the way into the transition portion length (636), and at least 65% in another embodiment, and at least 80% in still a further embodiment. Thus, if the exterior diameter of the nut (200) is constant from end to end, the nut wall thickness (220) would be reduced between the nut proximal end (204) and the nut bore proximal end (214) so that the nut proximal end (204) can extend over the expanding transition (630). Alternatively, the nut (200) may have one or more axial projections extending from the nut proximal end (204) designed to contact and force the expansion device (500) to the ED second position (532).

Additionally, in another embodiment the bushing head thickness (126) is greater than the insert wall thickness (138) and/or tail thickness (308), seen in FIG. 6, and at least 10% greater, and at least 20% greater in further embodiments. Further embodiments, again recognizing the goals and diminishing returns, and potential negative returns, the bushing head thickness (126) is no more than 200% greater than the insert wall thickness (138) and/or tail thickness (308), and 150%, and 100% in even more embodiments. Further, now with reference to FIG. 13, the maximum nut wall thickness (220) is greater than the insert wall thickness (138) and/or tail thickness (308), and is at least 5% greater in one embodiment, and at least 10% greater in still a further embodiment. Further, in one embodiment the receiver depth (408) is less than the insert wall thickness (138) and/or tail thickness (308), and is at least 5% less in one embodiment, and at least 10% less in still a further embodiment.

Figure 3:
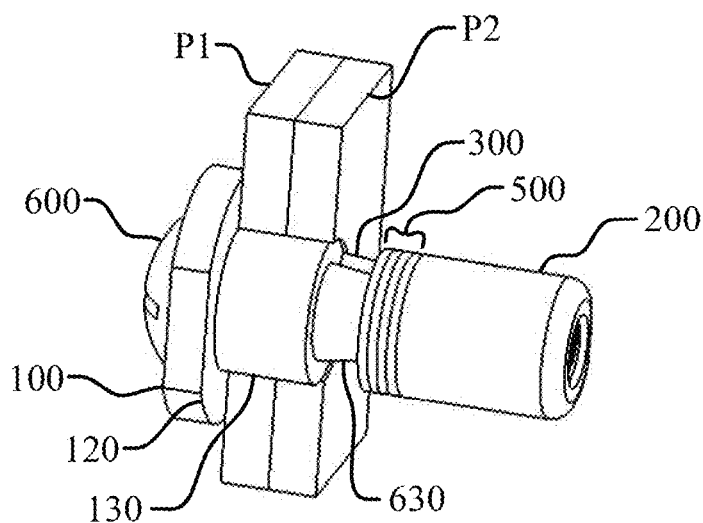
FIG. 3 is a perspective view of an embodiment of a blind fastener.

The strength of the joint is also dependent on the ED length (506), seen in FIG. 8. This particular figure illustrates a single expansion device (500) in two different locations, illustrating the undeformed state in the ED first position (530), and the expanded state, abutting the second panel (P2), in the ED second position (532); however as seen in FIGS. 2 & 3 embodiments are anticipated that incorporate multiple expansion devices (500). Thus, one embodiment incorporates a single expansion device (500), while further embodiments incorporate 2, 3, 4, 5, 6, 7, 8, 9, and even 10 or more expansion devices (500). In one embodiment the ED length (506) is at least 15% of the bushing head thickness (126), seen in FIG. 6, while in another embodiment it is at least 25%, and at least 35% in yet a further embodiment.

The ED length (506) of any single expansion device (500) significantly influences the usability, durability, and repeatability of the blind fastener. As such, in one embodiment the ED length (506) of any single expansion device (500) is no greater than the ED thickness (508), seen in FIG. 7, and no greater than 70% in another embodiment, and no greater than 35% in still a further embodiment. Likewise, in another embodiment the ED length (506) of any single expansion device (500) is no greater than 50% of the bushing head thickness (126), seen in FIG. 6, and no greater than 40% in another embodiment, and no greater than 30% in still a further embodiment. In embodiments having multiple expansion devices (500) the sum total ED length (506) of the individual expansion devices (500) is at least 50% of the bushing head thickness (126), at least 70% in another embodiment, and at least 90% in still a further embodiment, all the while the ED length (506) of each individual expansion device (500) is no greater than 50% of the bushing head thickness (126), and 40%, 30%, and 20% in additional embodiments. Similarly, in embodiments having multiple expansion devices (500) the sum total ED length (506) of the individual expansion devices (500) is no greater than 50% of the nut length (206), and no greater than 35% and 25% in further embodiments, all the while the ED length (506) of each individual expansion device (500) is no greater than 50% of the bushing head thickness (126), and 40%, 30%, and 20% in additional embodiments. Further, the ED length (506) of each individual expansion device (500) is no greater than 60% of the difference between the shank cross-sectional dimension (618) and the threaded portion cross-sectional dimension (628), and no greater than 50% in another embodiment, and no greater than 45% in still a further embodiment.

The screw transition (630), seen best in FIG. 15, may be formed with a constant diameter shelf, not illustrated by easily understood, abutting the screw shank (610). Such a shelf would ensure that the ED expanded max dimension (520) is the same for each expansion device (500). Additionally, a permanent version may be formed by having the diameter of the shelf be slightly less than the diameter of the transition (630) adjacent the shelf such that the expansion device(s) (500) expands as they are forced along the axis of the screw (600) and then they snap onto the shelf region as the travel off the tapered portion and onto the smaller diameter shelf. Thus, the change in diameter from the largest diameter on the transition to the smaller diameter shelf creates a wall to prevent the expansion device (500) from traveling back toward the ED first position (530), thereby creating a permanent blind fastener.

Further, in additional embodiments the nut length (206) is at least as great as the tail length (306), the transition portion length (636), and/or the bushing length (106). However, in a further embodiment the nut length (206) is no greater than the sum of the tail length (306) and the bushing length (106), and/or the sum of the bushing length (106) and the transition portion length (636). Since the tail (300) prevents the nut (200) from rotating as it is drawn toward the bushing (100), while overcoming the resistance associated with forcing the expansion device (500), or devices, onto the transition (630) and deforming the expansion device (500), or devices, the tail length (306), the minimum tail width (314), and the tail thickness (308) influence ease of use and durability, and must be balanced with the need for weight savings. The tail length (306) is at least 50% of the nut length (206) in one embodiment, at least 70% in another embodiment, and at least 90% in still a further embodiment. Additionally, the minimum tail width (314) is at least 25% of the tail length (306) in one embodiment, at least 30% in another embodiment, and at least 35% in still a further embodiment. However, a series of embodiments caps this relationship with the minimum tail width (314) being no more than 85% of the tail length (306), and no more than 70% and 55% in further embodiments.

Now to put the disclosed ranges and relationships into perspective with an embodiment of the blind fastener directed to aerospace applications where size, weight, and durability are essential, in an embodiment the shank cross-sectional dimension (618) and/or the bushing bore diameter (118) is no more than 0.50", and 0.4" in another embodiment, and 0.3" in a further embodiment; while in a further series of embodiments the shank cross-sectional dimension (618) and/or the bushing bore diameter (118) is at least 0.1", and at least 0.2" in another embodiment, and 0.22"-0.28" in a further embodiment. The bushing bore length (116) is no more than 1.0" in an embodiment, and no more than 0.75", 0.50", and 0.40" in additional embodiments. However, in another series of embodiments the bushing bore length (116) is at least 0.20" in an embodiment, and at least 0.25", 0.30", and 0.35" in additional embodiments. The tail length (306) is no more than 0.80" in an embodiment, and no more than 0.60", 0.50", and 0.40" in additional embodiments. However, in another series of embodiments the tail length (306) is at least 0.10" in an embodiment, and at least 0.15", 0.20", and 0.25" in additional embodiments. The nut length (206) and/or receiver length (406) is no more than 0.750" in an embodiment, and no more than 0.650", 0.550", and 0.450" in additional embodiments. However, in another series of embodiments the nut length (206) and/or receiver length (406) is at least 0.200" in an embodiment, and at least 0.250", 0.300", and 0.350" in additional embodiments. The bushing insert wall thickness (138) and/or the tail thickness (308) is no more than 0.125" in an embodiment, and no more than 0.100", 0.075", and 0.650" in additional embodiments. However, in another series of embodiments the bushing insert wall thickness (138) and/or the tail thickness (308) is at least 0.025" in an embodiment, and at least 0.035", 0.045", and 0.055" in additional embodiments. The transition portion length (636) is no more than 0.60" in an embodiment, and no more than 0.50", 0.40", and 0.30" in additional embodiments. However, in another series of embodiments the transition portion length (636) is at least 0.10" in an embodiment, and at least 0.15", 0.20", and 0.25" in additional embodiments.

The ED length (506) is no more than 0.050" in an embodiment, and no more than 0.045", 0.035", and 0.025" in additional embodiments. However, in another series of embodiments the ED length (506) is at least 0.010" in an embodiment, and at least 0.015", 0.020", and 0.025" in additional embodiments. The bushing head thickness (126) is no more than 0.250" in an embodiment, and no more than 0.200", 0.150", and 0.125" in additional embodiments. However, in another series of embodiments the bushing head thickness (126) is at least 0.050" in an embodiment, and at least 0.075", 0.010", and 0.125" in additional embodiments. The ED initial max dimension (518) is no more than 0.750" in an embodiment, and no more than 0.650", 0.550", and 0.450" in additional embodiments. However, in another series of embodiments the ED initial max dimension (518) is at least 0.200" in an embodiment, and at least 0.250", 0.300", and 0.350" in additional embodiments.

In the embodiments of FIGS. 1-15, one particular embodiment has a bushing volume that is within 25% of a screw volume, and within 15% in another embodiment, and within 5% in still a further embodiment. In a further embodiment a nut volume is at least 40% of the bushing volume, and at least 50%, and 60%, in additional embodiments; while preferably no more than 90% of the bushing volume, and no more than 80%, and 70% in further embodiments. Additionally, the total volume of the expansion device(s) (500) is no more than 30% of the nut volume in an embodiment, and no more than 25%, and 20% in still further embodiments. In one embodiment at least one of the bushing (100) and the screw (600) are no more than 10 grams, and no more than 8 grams, and no more than 6 grams in further embodiments, while the nut (200) is at least 1.5 grams, and at least 2.5 grams, and at least 3.5 grams in further embodiments; and these relationships are true for both the bushing (100) and the screw (600) in another embodiment. In one embodiment the bushing (100) is non-metallic and is no more than 2.0 grams, and no more than 1.5 grams, and 1.25 grams in further embodiments; while in a further embodiment the nut (200) is also non-metallic and is no more than 1.0 grams, and no more than 0.8 grams, and no more than 0.6 grams in further embodiments; while in an even further embodiment the screw (600) is metallic yet is no more than 3 times the mass of the bushing (100) and no more than 6 times the mass of the nut (200).

Additional embodiments are illustrated in FIGS. 16-36. In these embodiments the expansion device(s) (500) are expanded via a cam (900) rather than via the screw transition (630) of FIGS. 1-15, and they may incorporate a retainer (700) rather than a nut (200), a spring (800), and new arrangements and features of some of the components in common with the embodiments of FIGS. 1-15, however the same principal of elastic deformation of a at least one expansion device (500) remains.

Figure 16:
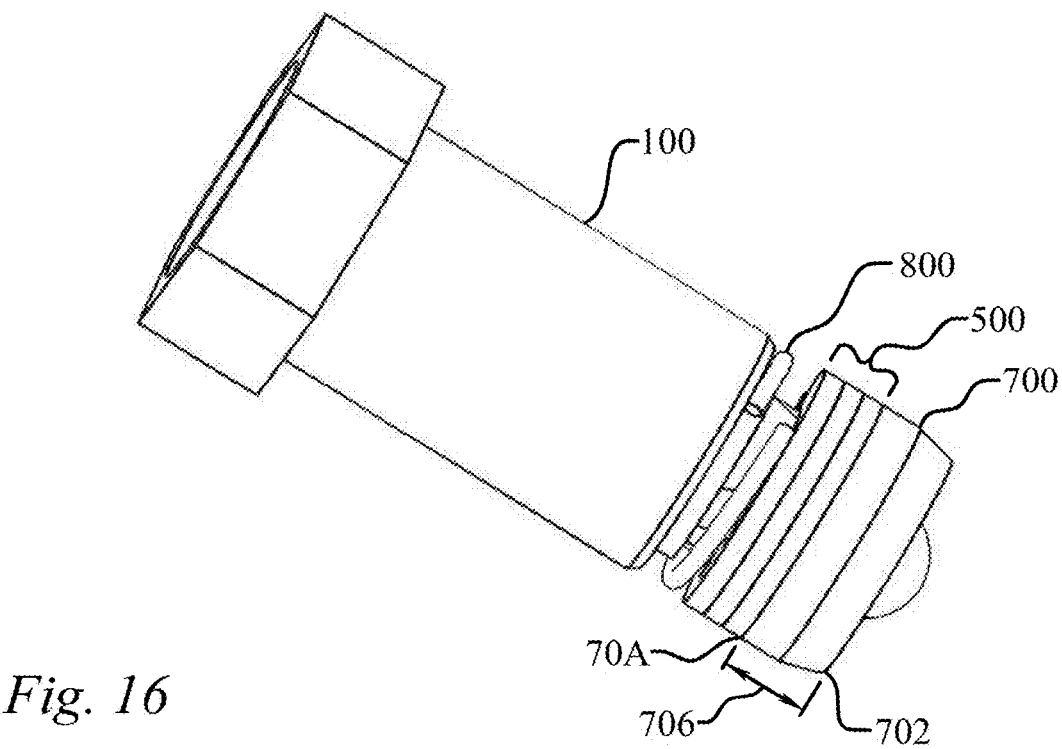
FIG. 16 is a perspective view of an embodiment of a blind fastener.
Figure 17:
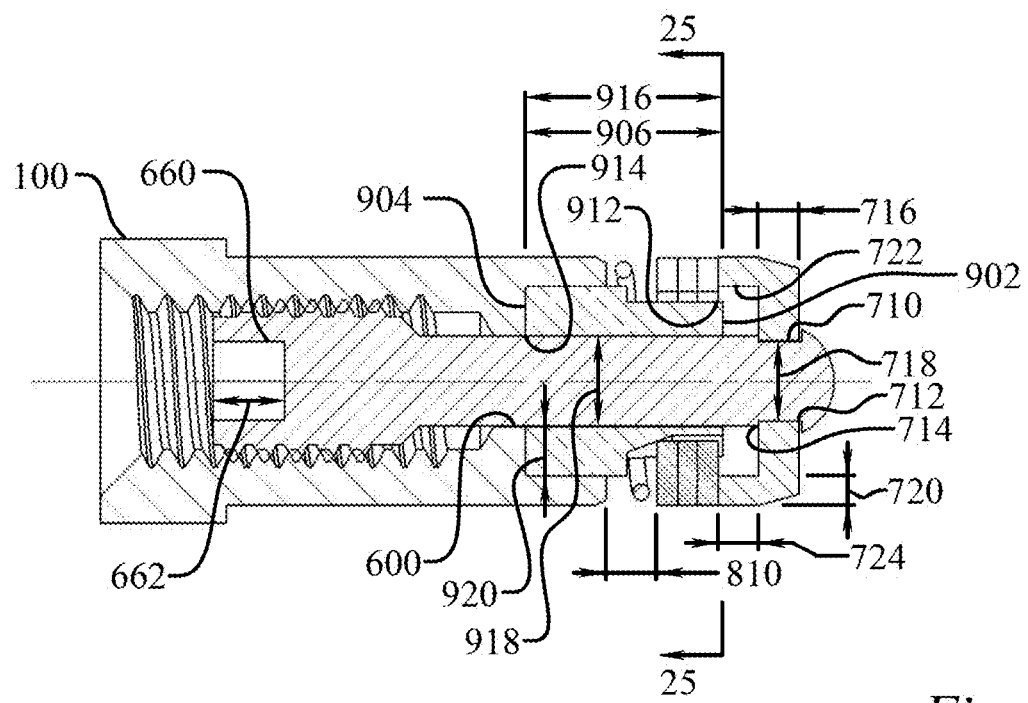
FIG. 17 is a partial sectional view of an embodiment of a blind fastener.
Figure 18:
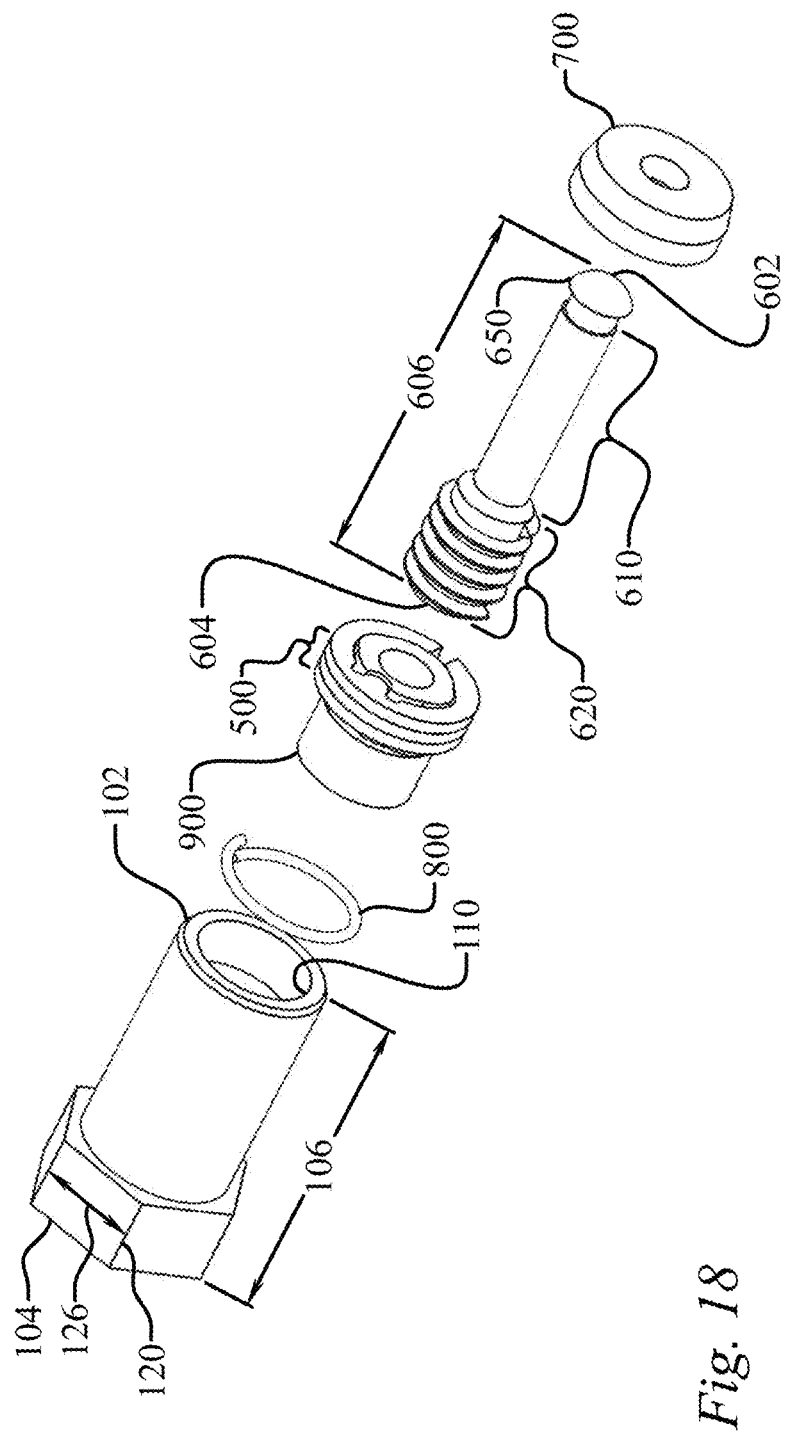
FIG. 18 is an exploded view of an embodiment of a blind fastener.
Figure 19:
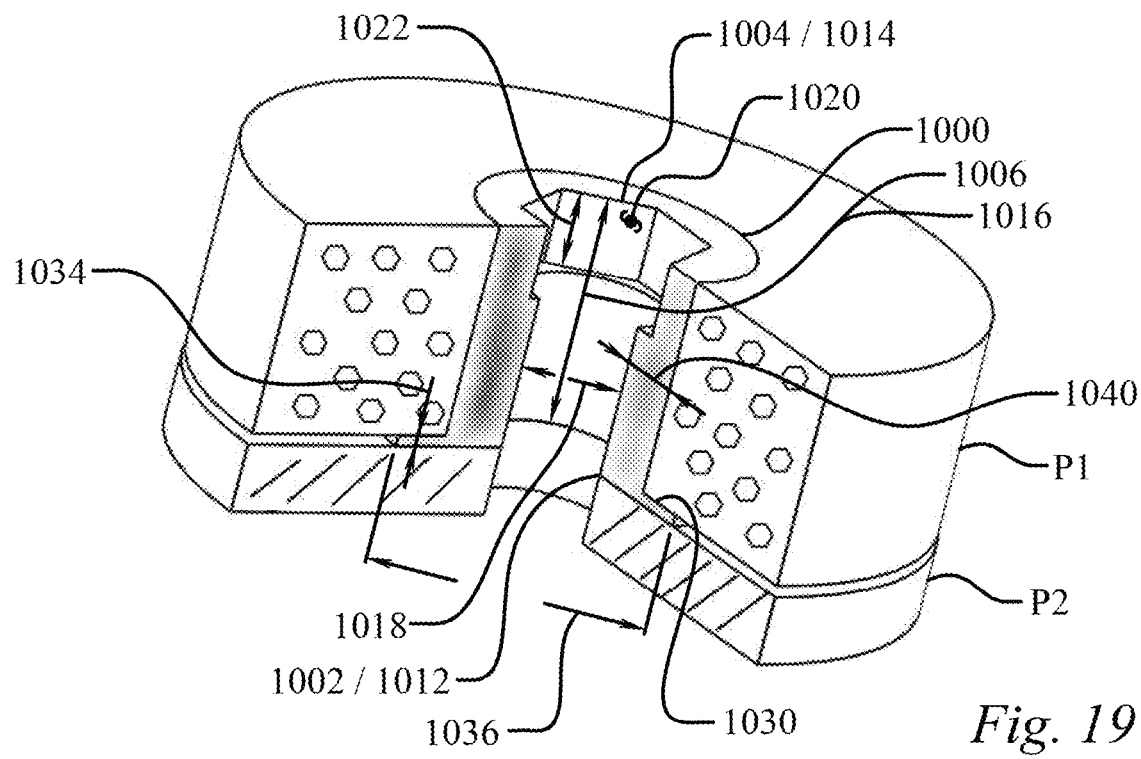
FIG. 19 is a partial cross-sectional view of a component of an embodiment of a blind fastener.
Figure 20:
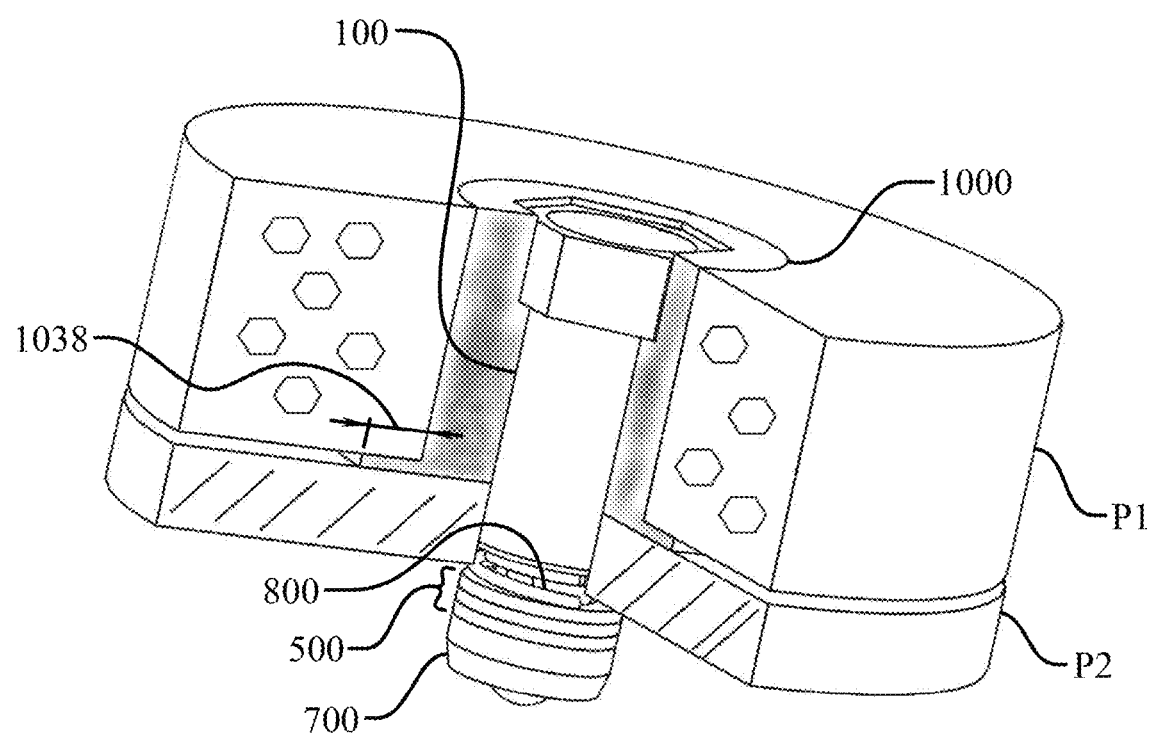
FIG. 20 is a partial cross-sectional view of an embodiment of a blind fastener.

As seen in FIGS. 16 and 17, the basics aspects of the bushing (100) remain the same, only now the bushing head (120) ends up recessed within a secondary bushing (1000), seen in FIGS. 19 and 20, and now a portion of the bushing bore is threaded. As seen in FIGS. 17 and 18, the screw (600) has a shank (610) and a threaded portion (620), only the positions are reversed compared to the embodiments of FIGS. 1-15, and likewise the screw head (650) is at the screw distal end (602) and serves to retain the retainer (700) as opposed to actuate the blind fastener as in the embodiments of FIGS. 1-15. In this embodiment the screw (600) incorporates a screw engagement recess (660) having a recess length (662), as seen in FIG. 17, to accept a tool to rotate the screw (600) with respect to the stationary bushing (100).

Figure 21:
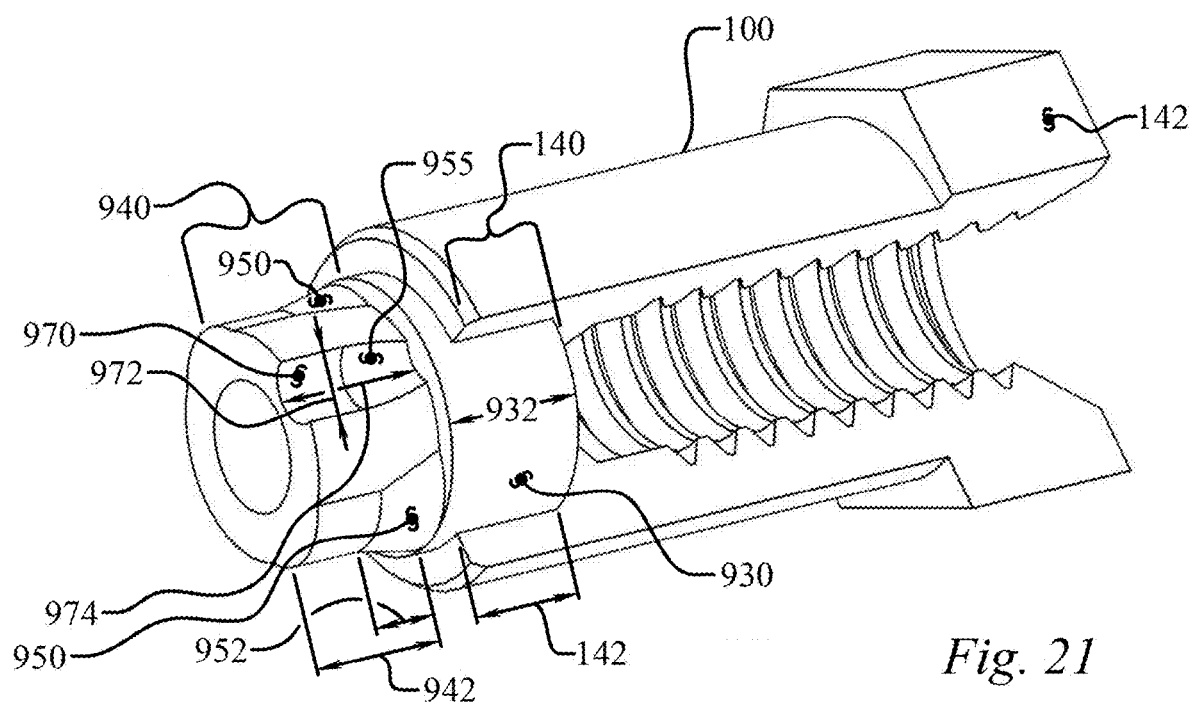
FIG. 21 is a partial cross-sectional view of a component of an embodiment of a blind fastener.
Figure 22:
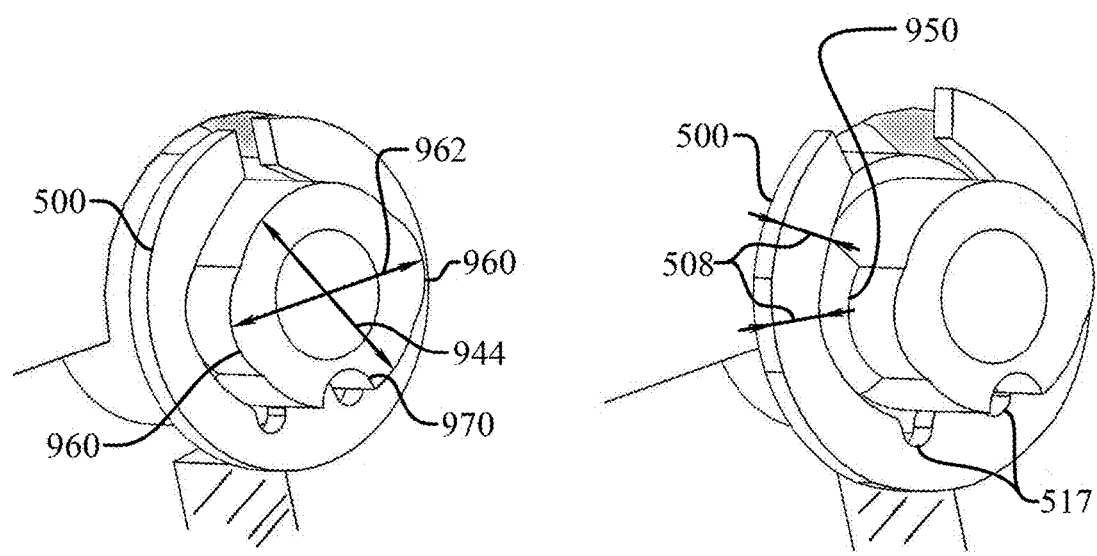
FIG. 22 is a perspective view of some components of a blind fastener in two different states.
Figure 23:
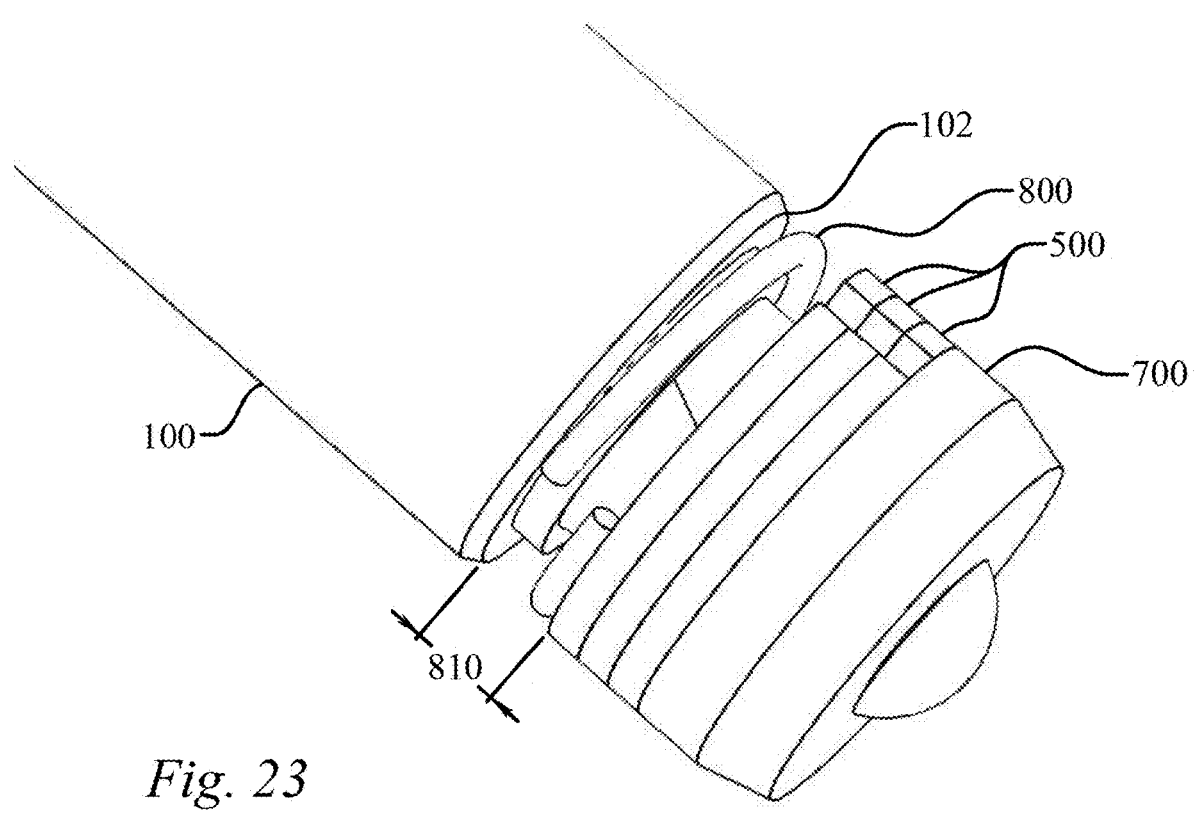
FIG. 23 is a partial perspective view of some components of an embodiment of a blind fastener.

As seen in FIGS. 17, 18, and 21, this embodiment incorporates a cam (900) mounted in the bushing distal end (102), as seen in FIG. 21. Referring to FIG. 17, the cam (900) includes a cam distal end (902), a cam proximal end (904), and a cam length (906) between the cam distal end (902) and the cam proximal end (904). The cam has a cam bore (910), through which passes the screw shank (610), and having a cam bore diameter (918). The cam bore (910) has a cam bore distal end (912), a cam bore proximal end (914), a cam bore length (916) between the cam bore distal end (912) and the cam bore proximal end (914), and a cam wall thickness (920). In the illustrated embodiment the cam bore length (916) is the same as the cam length (906). The cam (900) has a cam wall thickness (920). Referring to FIG. 21, the cam (900) has a cam mounting portion (930), a portion of which is mounted in a cam receiver (140) formed in the bushing distal end (102), and a cam engagement portion (940), which engages the expansion device(s) (500). The cam mounting portion (930) has a cam mounting portion length (932), the cam engagement portion (940) has a cam engagement portion length (942), and the cam receiver (140) has cam receiver length (142). As seen in FIG. 22, the cam engagement portion (940) has an engagement cross-sectional dimension (944), which is a diameter for circular portions of the cam engagement portion (940).

Referring back to FIG. 21, the cam engagement portion (940) has a cam transition (950) with a cam transition length (952). All of the prior disclosure related to the screw transition (630), its sub-elements, and all associated relationships to other components apply equally to the cam transition (950) but will not be repeated here as it is easily understood by one skilled in the art. In one embodiment the cam transition length (952) is at least 15% of the cam receiver length (142), the cam mounting portion length (932), and/or the cam engagement portion length (942), and is at least 25% in another embodiment, and at least 35% in yet a further embodiment. An upper cap is introduced in another series of embodiments, the first having a cam transition length (952) of less than 75% of the cam receiver length (142), the cam mounting portion length (932), and/or the cam engagement portion length (942), and less than 65% in another embodiment, and less than 55% in yet a further embodiment. The cam receiver length (142) and/or the cam mounting portion length (932) is at least 7.5% of the bushing length (106), at least 12.5% in another embodiment, and at least 15% in still a further embodiment; yet in further embodiments no more than 50%, 40%, and 30%. Further, the cam receiver length (142) and/or the cam mounting portion length (932) is at least 50% of the cam engagement portion length (942), at least 70% in another embodiment, and at least 90% in still a further embodiment; yet in further embodiments no more than 150%, 130%, and 110%.

As with the screw transition (630) of FIG. 15, the cam transition (950) may extend all the way around the cam (900) or it may consist of one or more cam segments, as seen in FIG. 21, that only cover a portion of the periphery. One embodiment incorporates two cam transitions (950) spaced 180 degrees apart, which each one occupying no more than 90 degrees of the perimeter of the cam engagement portion (940), and no more than 75 degrees in another embodiment, and no more than 60 degrees in still a further embodiment. However in a further series of embodiments each one should occupy at least 15 degrees of the perimeter of the cam engagement portion (940), and at least 25 degrees in another embodiment, and at least 30 degrees in still a further embodiment.

As shown in FIG. 22, another embodiment may incorporate at least one lobe (960), and a cam transition (950) may coincide with the lobe (960) location to transition from an exterior surface of the lobe (960) to an exterior surface of the cam mounting portion (930). The apex of a lobe (960) establishes a lobe cross-sectional dimension (962) as the shortest distance to the opposite side of cam engagement portion (940) located 180 opposed to the apex, which as shown in the embodiment of FIG. 22 coincides with a second apex of a second lobe (960). As seen in FIG. 22, the lobe (960) only covers a portion of the periphery. One embodiment incorporates two lobes (960) spaced 180 degrees apart, which each one occupying no more than 90 degrees of the perimeter of the cam engagement portion (940), and no more than 75 degrees in another embodiment, and no more than 60 degrees in still a further embodiment. However, in a further series of embodiments each one should occupy at least 15 degrees of the perimeter of the cam engagement portion (940), and at least 25 degrees in another embodiment, and at least 30 degrees in still a further embodiment. The lobe (960), or lobes, necessitate an expansion device (500) with a variable ED thickness (508) to maintain a constant ED initial exterior surface radius (522). The lobe cross-sectional dimension (962) is preferably at least 2.5% larger than the engagement cross-sectional dimension (944), and at least 4% larger in another embodiment, and at least 5.5% larger in yet a further embodiment. However, another series of embodiments caps this relationship to achieve the goals, specifically the lobe cross-sectional dimension (962) is no more than 30% larger than the engagement cross-sectional dimension (944), and no more than 25%, and 20% in still further embodiments. All of the disclosure relating to the expansion device (500) of FIGS. 1-15 applies equally to the embodiments of FIGS. 16-36.

Additionally, the cam engagement portion (940) may incorporate a channel (970), which extends radially inward from an outer surface of the cam engagement portion (940), and extends longitudinally from a distal end of the cam engagement portion (940) a channel length (974), which is the same as cam engagement portion length (942) in FIG. 21 because the channel (970) extends from end to end cam engagement portion (940). The channel length (974) is that portion of the channel that is below the elevation of the adjacent surface of the cam engagement portion (940), which in the illustrated embodiment is the entire length of the cam engagement portion (940) because even a secondary cam transition (955) located in the channel (970) never rises to the elevation of the adjacent surface of the cam engagement portion (940). However, it is easy to appreciate embodiments in which a depth of the channel (970) is such that the secondary cam transition (955) does rise to, or even exceed, the elevation of the adjacent surface of the cam engagement portion (940). The channel depth is no greater than 80% of a maximum cam wall thickness (920), and 70%, and 60% in further embodiments. The channel (970) also has a channel width (972), which in one embodiment is no greater than 100% of the cam bore diameter (918), and no greater than 80% and 60% in further embodiments, yet in a further series of embodiments is at least 15% of the cam bore diameter (918), and at least 25% and 35% in further embodiments.

Figure 25:
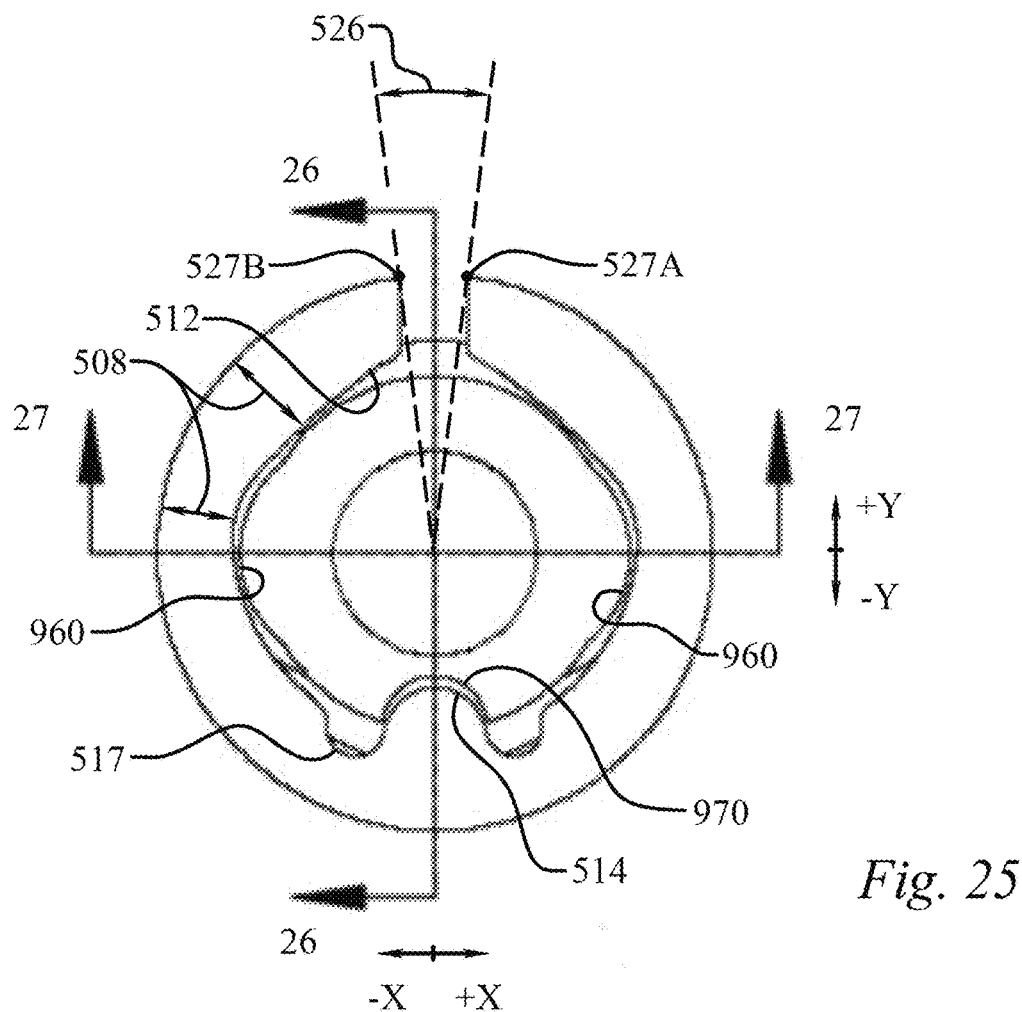
FIG. 25 is a cross-section taken along section line 25-25 in FIG. 17.
Figure 28:
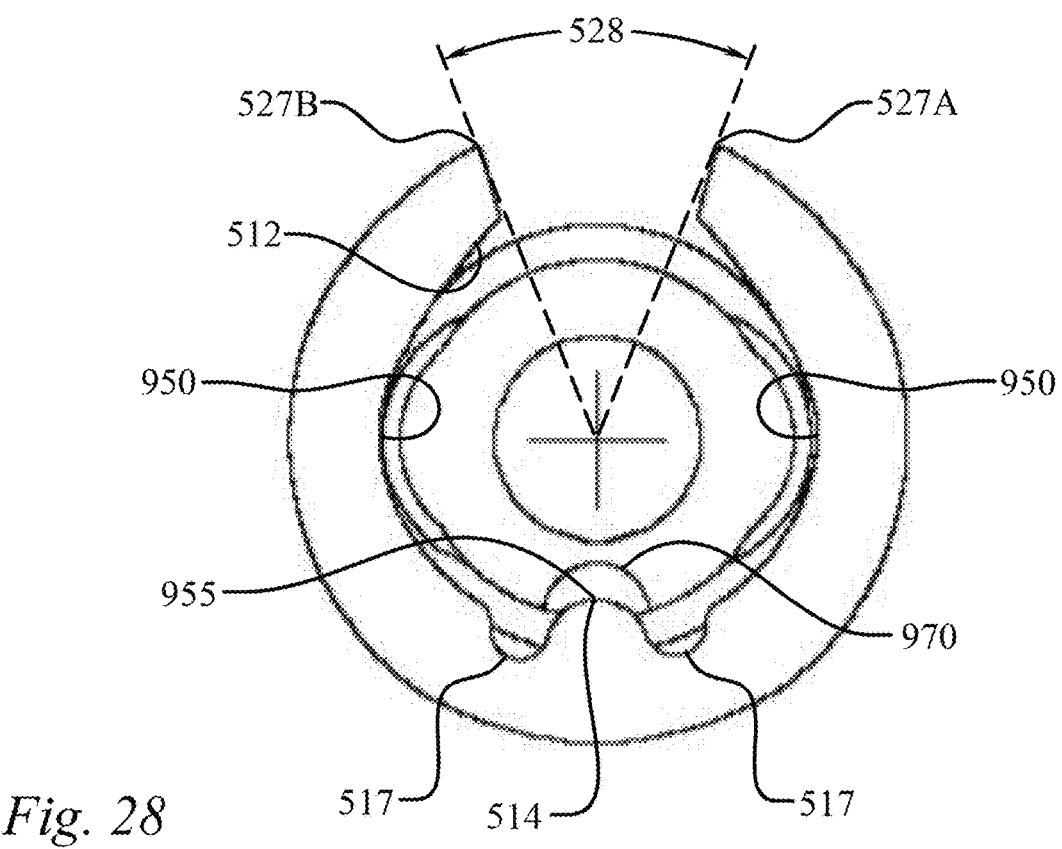
FIG. 28 is an expanded view of FIG. 25.
Figure 29:
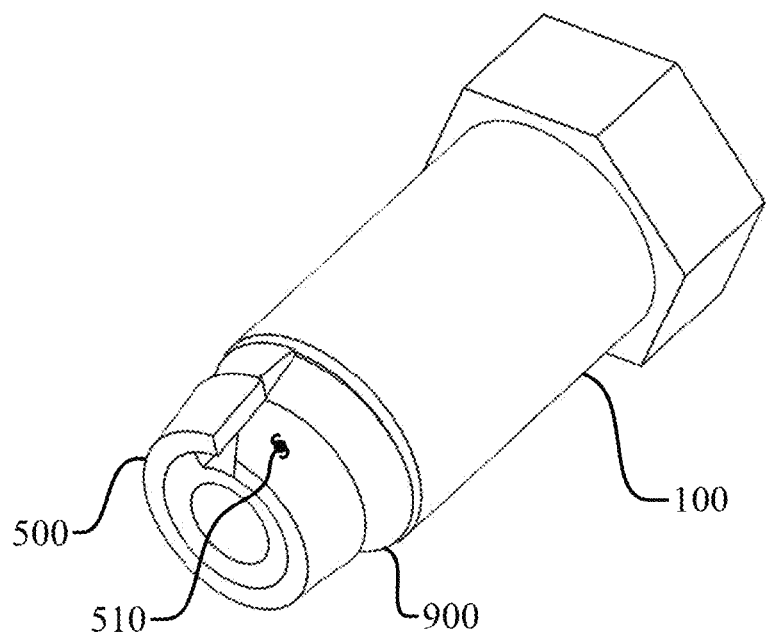
FIG. 29 is a perspective view of some components of an embodiment of a blind fastener in an initial state.

The channel (970) is sized and shaped to cooperate with an ED contact surface (514), such as those labeled in FIG. 7, but best seen with respect to the present embodiment in FIGS. 18, 22, 25, and 28, and can be thought of as a tongue, to prevent unintended rotation of the expansion device (500). Like FIG. 7, FIGS. 22 & 25 illustrates the unexpanded expansion device (500) at ED first position (530) in the left figure, while the right figure of FIG. 22, and FIG. 28, shows it in the expanded state at the ED second position (530). As seen in FIGS. 22 & 25, the expansion device (500) may include at least one stress reducing recess (517), and one on each side of the tongue, or ED contact surface (514) in the illustrated embodiment. In one embodiment the stress reducing feature (517) consists of a semi-circle with smooth transitions to the ED interior surface (512) and the ED contact surface (514) such that no radius of curvature is less than 5% of the average ED thickness (508), and no less than 10% in another embodiment, and no less than 15% in still a further embodiment. The stress reducing feature (517) aids in reducing stress concentrations as the expansion device (500) deforms but also reduces the force required to deform the expansion device (500). In a further embodiment the profile of majority of the channel (970) consists of a semi-circle with smooth transitions such that no radius of curvature is less than 5% of the average ED thickness (508), and no less than 10% in another embodiment, and no less than 15% in still a further embodiment.

Figure 26:
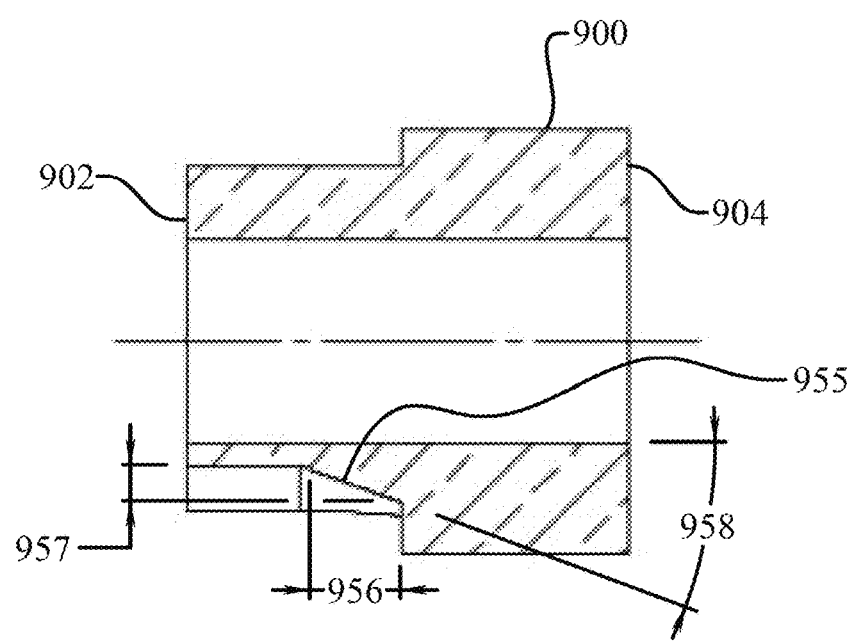
FIG. 26 is a cross-section taken along section line 26-26 in FIG. 25.
Figure 27:
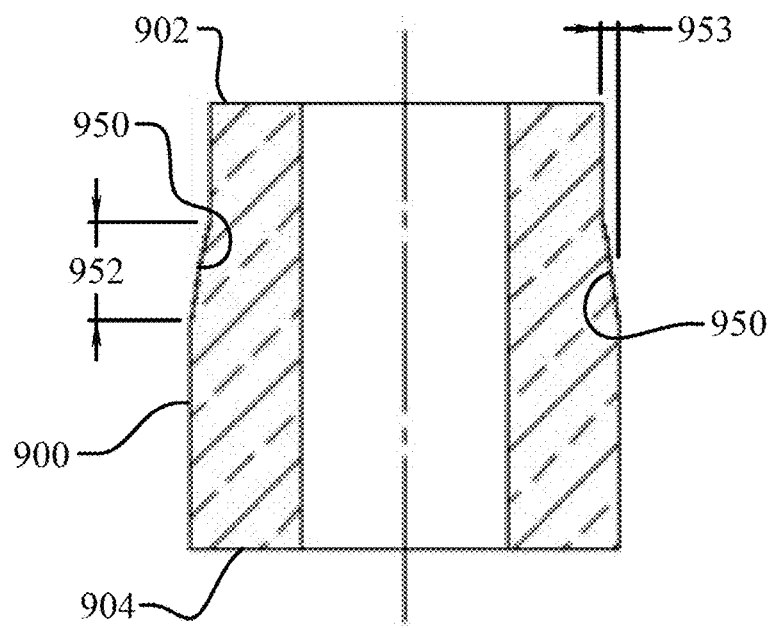
FIG. 27 is a cross-section taken along section line 27-27 in FIG. 25.

In embodiments having a secondary cam transition (955) within a channel (970), as seen in FIGS. 21, 25, 26, and 28, the configuration facilitates increased travel of the expansion device (500) in the negative Y direction, shown in FIG. 25, thereby drawing the initial sinistral gap opening point (527A) and the initial dextral gap opening point (527B) in the negative Y direction as the expansion device (500) is forced toward the cam proximal end (904). With reference to FIG. 26, as the expansion device (500), specifically the ED contact surface (514) or tongue, is forced onto the secondary cam transition (955) it moves from the initial position shown in FIG. 25 downward in the negative Y direction to the location shown in FIG. 28. At the same time the ED interior surface (512) may cooperate with at least one lobe (960), or in the illustrated embodiments two lobes (960) located 180 degrees apart, while also being forced onto a cam transition (950), or two cam transitions (950) as shown in the illustrated embodiments and aligned with the lobes (960). Thus, the initial sinistral gap opening point (527A) and the initial dextral gap opening point (527B) are being spread apart from the ED initial exterior surface gap angle (526) of FIG. 25 to the ED expanded exterior surface gap angle (528) of FIG. 28 via one or more of the negative Y direction motion of the expansion device (500) associated with the ED contact surface (514) or tongue cooperating with the secondary cam transition (955) and the ED interior surface (512) cooperating with at least one lobe (960) and/or at least one cam transition (950), or simply the cooperation of the ED interior surface (512) with at least one cam transition (950) and more like the embodiments of FIGS. 1-15, or a combination of all of these potential mechanisms as shown in FIGS. 25-28.

As seen in FIGS. 25-28, the secondary cam transition (955) has a secondary cam transition length (956), a secondary cam transition offset (957), and a secondary cam transition angle (958). Similarly, the cam transition (950) has a cam transition length (952), a cam transition offset (953), and a cam transition angle (954). Since the exterior dimensions of a blind fastener are often fixed, it is the curvature of the ED interior surface (512), or stated another way—the variations in the ED thickness (508), that may further promote the camming action associated with the cooperation of the ED interior surface (512) with a lobe (960) or cam transition (950) as the expansion device (500) is forced in the negative Y direction. In one embodiment the portion of the expansion device (500) that contacts the lobe (960) or cam transition (950) has a change in the ED thickness (508) that is at least 35% of the cam transition offset (953), and at least 50%, 65%, and 80% in further embodiments. In one embodiment, and using reference to an imaginary clock face at the center of FIG. 25 with the 12 o'clock position passing equidistant between the initial sinistral gap opening point (527A) and the initial dextral gap opening point (527B), the disclosed variations in the ED thickness (508) occur between the 1 o'clock and the 3 o'clock positions, and/or the 9 o'clock and the 11 o'clock positions, when the direction of travel associated with the expansion device (500) in the negative Y direction corresponds to the 6 o'clock position. Using the same frame of reference and origin of the clock face, a lobe (960) embodiment includes at least two lobes (960) with one positioned between the 1:30 and 4:30 positions and the other positioned between the 7:30 and 10:30 positions; and a further embodiment includes a cam transition (950) associated with each lobe (960) and also located within the aforementioned positions.

In another embodiment the cam transition length (952) and the secondary cam transition length (956) vary by no more than 20% of the less of the two lengths, and no more than 10% in another embodiment, and no more than 5% in still a further embodiment, and substantially equal in a final embodiment. While in a further embodiment the secondary cam transition angle (958) is at least 25% greater than the cam transition angle (954), and at least 50% greater in another embodiment, and at least 75% greater in still a further embodiment; however a further series of embodiments caps the relationship at no more than 200% greater in one embodiment, and 175%, 125%, and 100% in further embodiments.

In another embodiment a first distance from the cam transition (950) to the cam distal end (902) is within 25% of a second distance from the secondary cam transition (955) to the cam distal end (902), with the percentage calculated from the shorter of the two distances, and within 15% in another embodiments, and within 5% in still a further embodiment, and the distances are substantially equal in a final embodiment. Preferred spreading of the legs of the expansion device (500) results in better contact with the second panel (P2) and is found when the secondary cam transition offset (957) is at least 25% greater than the cam transition offset (953), and at least 50% greater, 75% greater, and 100% greater in further embodiments. A further series of embodiments caps this relationship in light of diminishing returns, and potentially negative returns, associated with the goals and therefore the secondary cam transition offset (957) is no more than 200% greater than the cam transition offset (953) in one embodiment, and no more than 175%, 150%, and 125% in still further embodiments.

In a related fashion, the secondary cam transition offset (957) is at least 5% less than the greatest depth of the channel (970) in one embodiment, and at least 10% less, 15% less, and 20% less in further embodiments. However, in another series of embodiments, the goals of the blind fastener are furthered in one embodiment when the secondary cam transition offset (957) is within 60% of the greatest depth of the channel (970), and within 50%, 40% and 30% in further embodiments. Regarding the opening of the expansion device (500), with reference to FIGS. 25 & 28, in one embodiment the ED expanded exterior surface gap angle (528) is at least 30% greater than the ED initial exterior surface gap angle (526), and at least 50% greater, at least 70% greater, and at least 100% greater in further embodiments. However, the increase in gap angle has a limit before significantly reducing the durability and fatigue characteristics of the expansion device (500). Specifically in one embodiment the ED expanded exterior surface gap angle (528) is no more than 400% greater than the ED initial exterior surface gap angle (526), and no more than 300% greater, no more than 200% greater, and no more than 150% greater in still further embodiments. Referring again to FIGS. 16 and 17, the retainer (700) has a retainer distal end (702), a retainer proximal end (704), and a retainer length (706) between the retainer distal end (702) and the retainer proximal end (704). In an embodiment the retainer (700) has a retainer bore (710) through which a portion of the screw (600) passes, although it is easy to anticipate many other ways that the screw (600) may engage the retainer (700) so that the retainer (700) moves longitudinally with the screw (600). The retainer bore (710) has a retainer bore distal end (712), a retainer bore proximal end (714), a retainer bore diameter (718), a retainer wall thickness (720), and a retainer bore length (716) between the retainer bore distal end (712) and the retainer bore proximal end (714). As seen in FIG. 17, as the screw (600) is rotated, via a tool engaging the screw engagement recess (660), it moves the retainer (700) toward the bushing head (120), the retainer engages the expansion device (500) and moves it along the cam transition (950) thereby elastically deforming the expansion device (500), as seen in FIGS. 22 and 7. The retainer (700) may be formed with a retainer leg (722) having a retainer leg length (724), which allows the retainer proximal end (704) to extend over the cam distal end (902) and force the expansion device (500) up the cam transition (950). The retainer leg length (724) is at least 50% of the cam engagement portion length (942), while in another embodiment it is at least equal to the difference of the cam engagement portion length (942) minus 75% of the cam transition length (952), and 50% in another embodiment and 35% in still a further embodiment.

As seen in FIGS. 16-18, some embodiments include a spring (800) that must be compressed for the expansion device (500) to move up the cam transition (950), and assists in moving the expansion device (500) off the cam transition (950) when disengaging the blind fastener. The longitudinal distance from the bushing distal end (102) to the nearest expansion device (500) is the spring region length (810), seen in FIG. 17.

Referring now to FIGS. 19 and 20, the blind fastener may also incorporate a secondary bushing (1000), which may be permanently installed in the first panel (P1) and is particularly beneficial when the first panel (P1) is a lightweight honeycomb panel being secured to second panel (P2) so that the secondary bushing (1000) can bear the load and protect the more delicate panel. In such an embodiment the secondary bushing (1000) is permanently installed in the first panel (P1). The secondary bushing (1000) has a secondary bushing distal end (1002), a secondary bushing proximal end (1004), a secondary bushing length (1006) between the secondary bushing distal end (1002) and the secondary bushing proximal end (1004), and a secondary bushing wall thickness (1040). Further, the secondary bushing (1000) is formed with a secondary bushing bore (1010) having a secondary bushing bore distal end (1012), a secondary bushing bore proximal end (1014), and a secondary bushing bore length (1016) between the secondary bushing bore distal end (1012) and the secondary bushing bore proximal end (1014). The secondary bushing (1000) has a secondary bushing bore diameter (1018), an engagement region (1020) having an engagement region length (1022), and a secondary bushing head (1030) having a secondary bushing head perimeter (1032), a secondary bushing head thickness (1034), a secondary bushing head max dimension (1036). The shape of engagement region (1020), as well as the engagement region length (1022), cooperate with the shape of the bushing head (120), as well as the bushing head thickness (126), thereby preventing the bushing (100) from rotating as the screw (600) is turned.

Unlike the embodiments of FIGS. 1-15, the secondary bushing head (1030) is located at the secondary bushing distal end (1002) and is designed to be located between the first panel (P1) and the second panel (P2). As such, the secondary bushing head thickness (1034) is less than 50% of the secondary bushing wall thickness (1040), and less than 35% in another embodiment, and less than 20% in still a further embodiment. The secondary bushing wall thickness (1040) is associated with the difference between the ED expanded max dimension (520) and the ED initial max dimension (518), specifically in one embodiment the maximum secondary bushing wall thickness (1040) is at least 2 times the difference, and at least 3 times in another embodiment, and at least 4 times in still a further embodiment. A secondary bushing head flange dimension (1038), seen in FIG. 20, is at least 50% of the maximum secondary bushing wall thickness (1040), and at least 70% in another embodiment, and at least 90% in still a further embodiment. Additionally, the secondary bushing head max dimension (1036) is at least 2 times the secondary bushing bore diameter (1018), at least 2.5 times in a further embodiment, and at least 3 times in still another embodiment.

Figure 24:
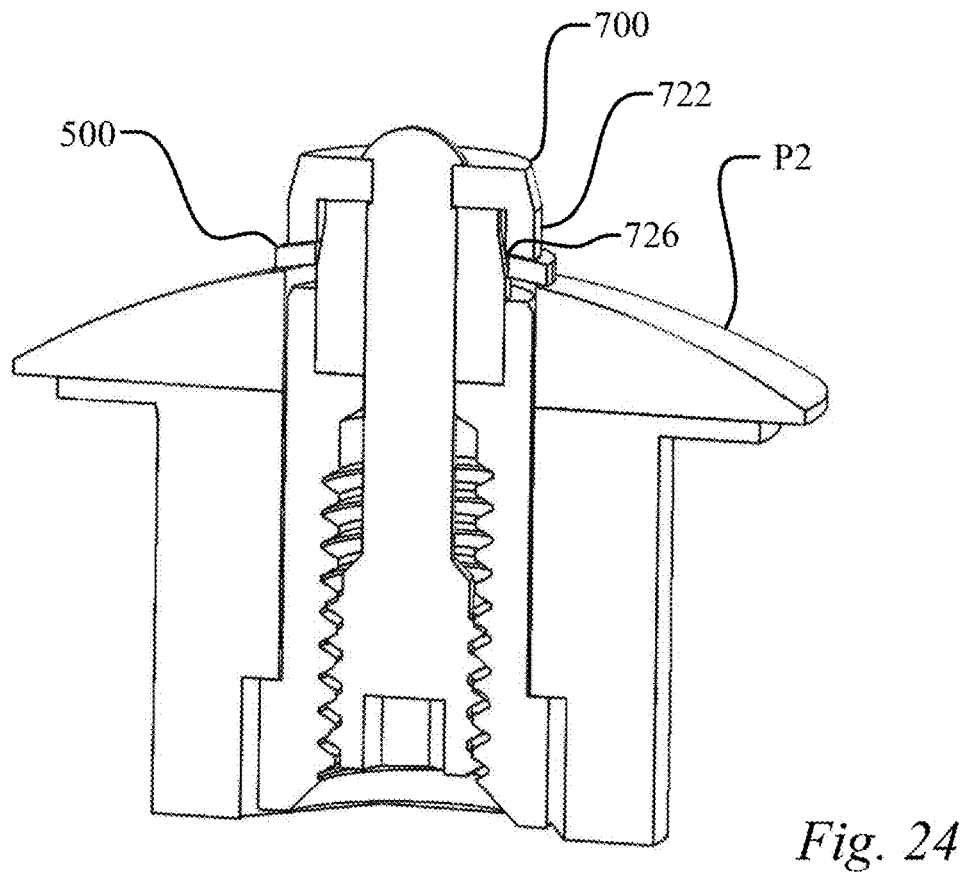
FIG. 24 is a cross-sectional view of an embodiment of a blind fastener.

As seen in FIG. 24, the blind fastener may be used to hold curved panels, such as the illustrated second panel (P2). In such embodiments the retainer leg contact surface (726) in contact with the expansion device (500) may be angled or curved, which is also true of the embodiments of FIGS. 29-36. In one embodiment the angle or curvature matches that of the second panel (P2). The retainer leg contact surface (726) ensures the expansion device (500) is also deformed so as to not damage the second panel (P2). The nut (200) of FIGS. 1-15 may also incorporate an angled or curved contact surface to influence and orient the expansion device (500) to accommodate curved panel applications. Further, in one embodiment any of the disclosed components, or portions thereof, may be coated with a lubricating material, which in a further embodiment is a dry lubricating coating.

Figure 30:
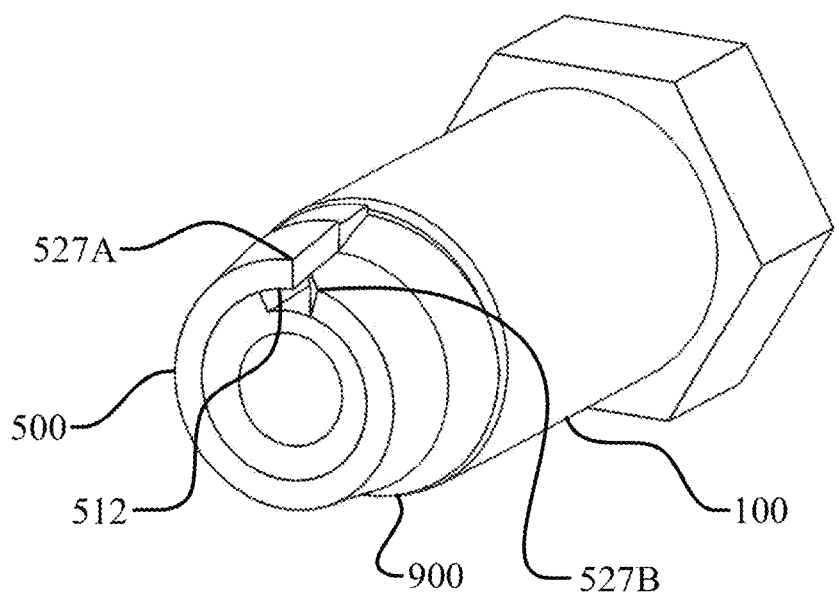
FIG. 30 is a perspective view of some components of an embodiment of a blind fastener in an initial state.
Figure 31:
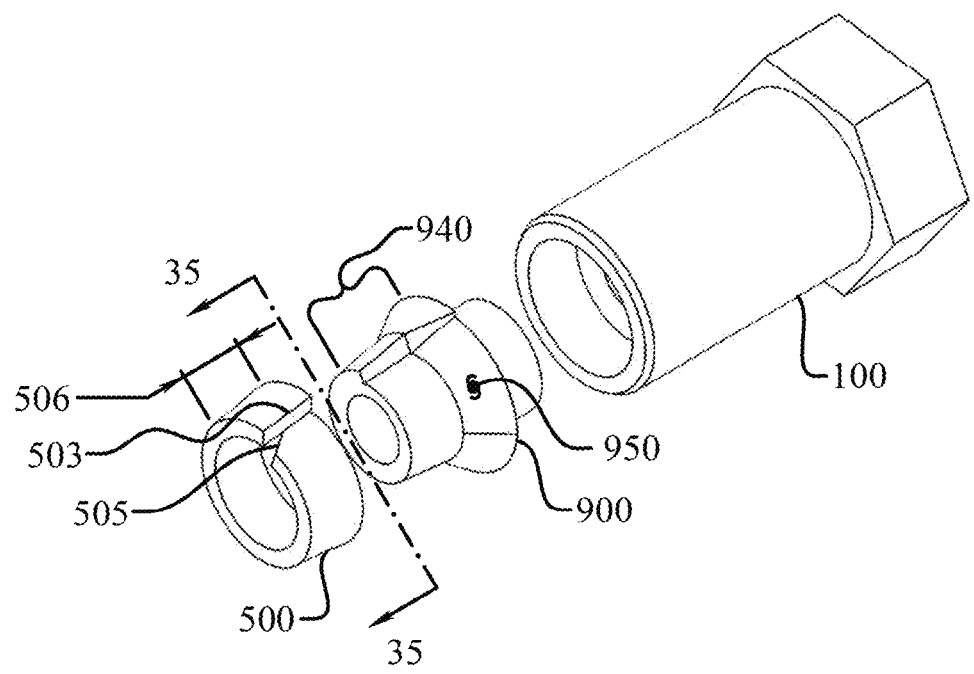
FIG. 31 is an exploded view of some components of an embodiment of a blind fastener in an initial state.
Figure 32:
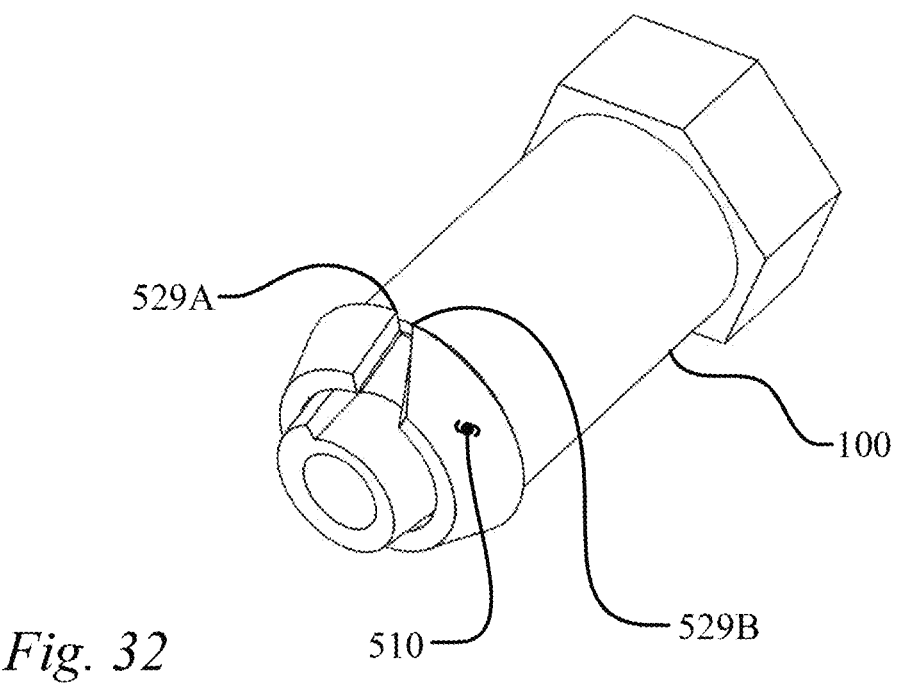
FIG. 32 is a perspective view of some components of an embodiment of a blind fastener in an expanded state.
Figure 33:
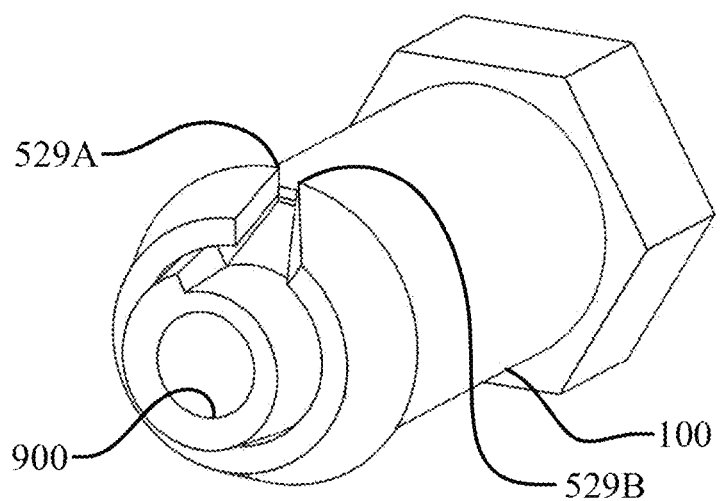
FIG. 33 is a perspective view of some components of an embodiment of a blind fastener in an expanded state.

Additional embodiments are illustrated in FIGS. 29-36, which may utilize the components of the embodiments of FIGS. 16-18 but only illustrate the bushing (100), the cam (900), and the expansion device (500). In these embodiments the expansion device (500) has a first ED endwall (503) and a second ED endwall (505), as seen in FIG. 31. In an embodiment a portion of the ED exterior surface (510) at the second ED endwall (505) passes under a portion of the ED interior surface (512), as seen best in the initial state, or unexpanded state, shown in FIGS. 29-31 and 35. Thus, in one embodiment a portion of the first ED endwall (503) and the second ED endwall (505) overlap nearest the bushing (100), such as that seen in FIG. 31, while a portion of the first ED endwall (503) and the second ED endwall (505) do not overlap creating a gap between an initial sinistral gap opening point (527A) and an initial dextral gap opening point (527B), as seen in FIG. 30.

Figure 34:
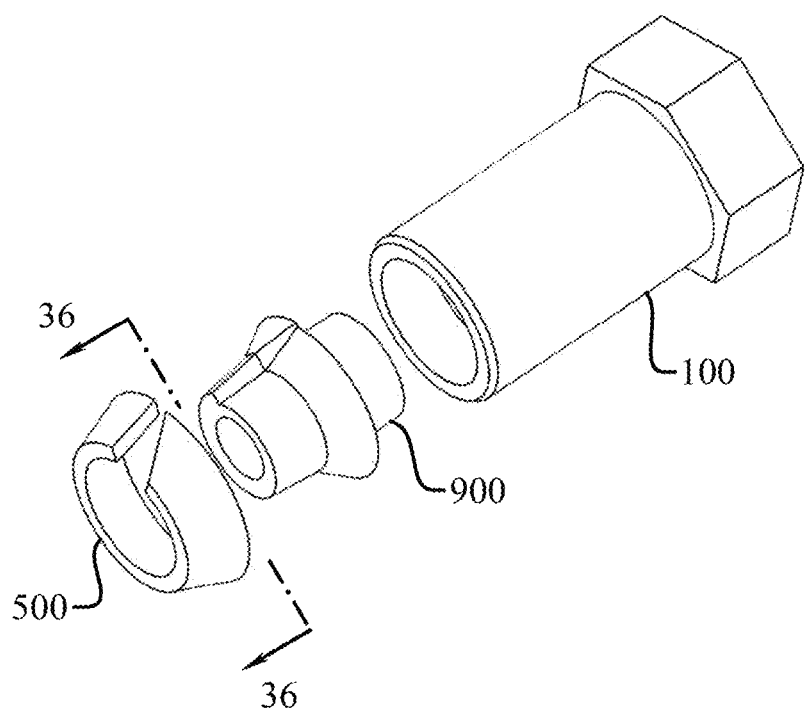
FIG. 34 is an exploded view of some components of an embodiment of a blind fastener in an expanded state.
Figure 35:
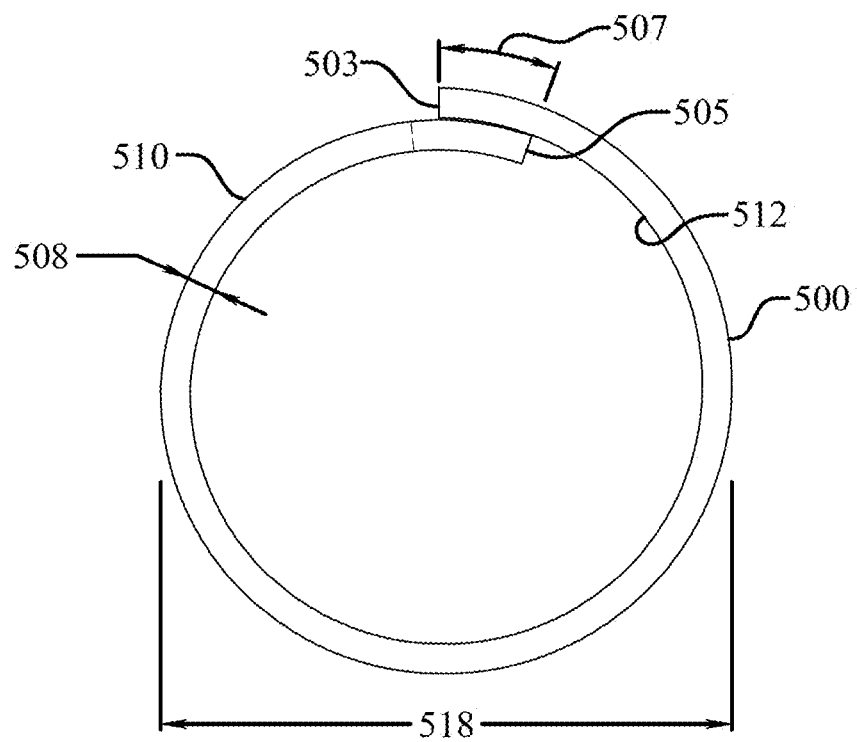
FIG. 35 is a side elevation view of an embodiment of an expansion device in an initial state.
Figure 36:
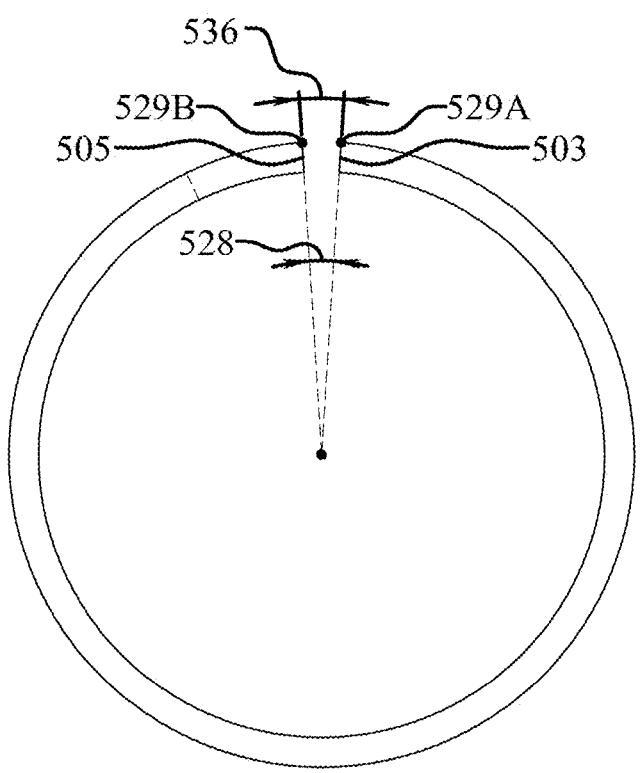
FIG. 36 is a side elevation view of an embodiment of an expansion device in an expanded state.

With reference to FIGS. 31 & 35, in the initial state the expansion device (500) has an ED overlap (507) along a portion of the first ED endwall (503) and the second ED endwall (505), whereas in the expanded state, and reference to FIGS. 34 & 36, the expansion device (500) has an ED gap (536) along a portion of the first ED endwall (503) and the second ED endwall (505). Reference to the ED overlap (507) refer to the maximum overlap distance in the initial state, whereas reference to the ED gap (536) refer to the minimum gap distance in the expanded state. This particular design and the ED overlap (507) facilitates increased contact area, or to put it another way—less gap between the expanded sinistral gap opening point (529A) and expanded dextral gap opening point (529B), therefore a reduced ED expanded exterior surface gap angle (528), and more contact area between the expansion device (500) and the second panel (P2).

In one embodiment the ED expanded exterior surface gap angle (528) is no more than 20 degrees, and no more than 15 degrees, 10 degrees, and 5 degrees in further embodiments. The goals and increased contact area are further enhanced in a series of embodiments in which the ED overlap (507) is at least equal to the ED thickness (508), and at least twice the ED thickness (508) in another embodiment, and at least three times the ED thickness (508) in still a further embodiment. Likewise, in another embodiment the ED overlap (507) is at least equal to 25% of the ED length (506), and at least 50% in another embodiment, and at least 75% in still a further embodiment. Further, the ED gap (536) is less than 4 times the ED thickness (508) in an embodiment, and less than 3 times, and 2 times in still additional embodiments.

At least a portion of the first ED endwall (503) and the second ED endwall (505) are not parallel in an embodiment, whereas in another embodiment the entirety of the first ED endwall (503) and the second ED endwall (505) are not parallel. In fact, in further embodiments the angle between the first ED endwall (503) and the second ED endwall (505), in the initial state as seen in FIG. 31, is at least 2.5 degrees, and at least 5 degrees in another embodiment, and at least 7.5 degrees in still a further embodiment. However, another series recognizes the diminishing returns and caps the angle differential to no more than 60 degrees, and no more than 50 degrees, 40 degrees, and 30 degrees in additional embodiments.

In one embodiment, such as best seen in FIG. 31, the ED expanded exterior surface radius (524), seen in FIG. 7 but easily understood with respect to FIG. 31, varies throughout the ED length (506). In the embodiment of FIG. 31, the ED expanded exterior surface radius (524) is larger nearest the bushing (100), and similarly the portion of the cam engagement portion (940) that cooperates with the expansion device (500), in the initial state, may also be tapered to match the change in the expansion device (500). In one embodiment the ED expanded exterior surface radius (524) varies by at least 1%, measured relative to the minimum radius, throughout the ED length (506), and by at least 2%, 3%, and 4% in further embodiments; however in another series of embodiments it varies by no more than 20%, and no more than 15% in another embodiment, and no more than 10% in still a further embodiment.

As seen in FIG. 31, the taper, or angle, of the cam transition (950) may vary around the perimeter of the cam (900). For instance the secondary cam transition angle (958), seen in FIG. 26, is easily understood with respect to the cam transition (950) shown in FIG. 31. Applying a clock face to the end of the cam (900) with 12 o'clock in the vertical position, the secondary cam transition angle is small to the left side of the drop-off located near the 12 o'clock position, and is significantly greater to the right side of the drop-off. For simplicity of explanation, a first average secondary cam transition angle in a first quadrant is at least 50% greater than a second average secondary cam transition angle in a second quadrant, and at least 75% greater in another embodiment, and at least 100% greater in still a further embodiment; however, in another series of embodiments the change between average secondary cam transition angles in any quadrant is no more than 500%, and no more than 400% in another embodiment, and no more than 300% in still a further embodiment. Further, in another embodiment the change between average secondary cam transition angles in any quadrant is no more than 30 degrees, and no more than 25 degrees in another embodiment, and no more than 20% in still a further embodiment. Additionally, the first average secondary cam transition angle in the first quadrant is at least 5 degrees greater than the second average secondary cam transition angle in the second quadrant, and at least 10 degrees greater in another embodiment, and at least 15 degrees greater in still a further embodiment. As seen in the embodiment of FIG. 31, the ED length (506) is at least 50% greater than the ED thickness (508) seen in FIG. 35, and at least 100% greater in another embodiment, and at least 150% greater in still a further embodiment; however another series of embodiments caps the ED length (506) at no more than 75% cam engagement portion length (942), seen in FIG. 21 but easily understood with respect to FIG. 31, and no more than 65% in another embodiment, and no more than 55% in still a further embodiment. As before with respect to the embodiments of FIGS. 1-15, some dimensions of a few embodiments will be disclosed to put the disclosed ranges and relationships into perspective for another embodiment of the blind fastener directed to aerospace applications where size, weight, and durability are essential, however the dimensions disclosed with respect to FIGS. 1-15 may also apply to the embodiments of FIGS. 16-364, particularly to the components in common such as the bushing (100), the expansion device(s) (500), the screw (600), and characteristics of the screw transition (630) as applied to the cam transition (950). The bushing length (106), and/or the secondary bushing bore length (1016), is no more than 2.00" in an embodiment, and no more than 1.50", 1.25", and 1.00" in additional embodiments. However, in another series of embodiments the bushing length (106), and/or the secondary bushing bore length (1016), is at least 0.20" in an embodiment, and at least 0.25", 0.30", and 0.35" in additional embodiments. The cam length (906) is no more than 0.40" in an embodiment, and no more than 0.35", 0.30", and 0.25" in additional embodiments. However, in another series of embodiments the cam length (906) is at least 0.10" in an embodiment, and at least 0.13", 0.16", and 0.19" in additional embodiments.

Additionally, the screw length (606) is no more than 1.00" in an embodiment, and no more than 0.85", 0.70", and 0.60" in additional embodiments. However, in another series of embodiments the screw length (606) is at least 0.30" in an embodiment, and at least 0.40", 0.50", and 0.55" in additional embodiments. The shank cross-sectional dimension (618) is no more than 0.200" in an embodiment, and no more than 0.150", 0.120", and 0.100" in additional embodiments. However, in another series of embodiments the shank cross-sectional dimension (618) is at least 0.040" in an embodiment, and at least 0.060", 0.075", and 0.085" in additional embodiments. The threaded portion length (626) is no more than 0.400" in an embodiment, and no more than 0.350", 0.300", and 0.250" in additional embodiments. However, in another series of embodiments the threaded portion length (626) is at least 0.075" in an embodiment, and at least 0.125", 0.150", and 0.175" in additional embodiments. The retainer leg length (724) is no more than 0.100" in an embodiment, and no more than 0.080", 0.060", and 0.050" in additional embodiments. However, in another series of embodiments the retainer leg length (724) is at least 0.010" in an embodiment, and at least 0.015", 0.020", and 0.025" in additional embodiments. The retainer wall thickness (720) is no more than 0.080" in an embodiment, and no more than 0.060", 0.040", and 0.030" in additional embodiments. However, in another series of embodiments the retainer wall thickness (720) is at least 0.010" in an embodiment, and at least 0.015", 0.020", and 0.025" in additional embodiments. The spring region length (810) is no more than 0.125" in an embodiment, and no more than 0.100", 0.085", and 0.070" in additional embodiments. However, in another series of embodiments the spring region length (810) is at least 0.020" in an embodiment, and at least 0.030", 0.040", and 0.050" in additional embodiments. The cam transition length (952) is no more than 0.125" in an embodiment, and no more than 0.100", 0.085", and 0.070" in additional embodiments. However, in another series of embodiments the cam transition length (952) is at least 0.020" in an embodiment, and at least 0.030", 0.040", and 0.050" in additional embodiments. The lobe cross-sectional dimension (962) is no more than 0.425" in an embodiment, and no more than 0.375", 0.325", and 0.275" in additional embodiments. However, in another series of embodiments the lobe cross-sectional dimension (962) is at least 0.050" in an embodiment, and at least 0.100", 0.125", and 0.150" in additional embodiments.

The material properties of the various components of the blind fastener are essential to the goals. In one embodiment the expansion device (500) is formed of a material different than at least one of the following: the bushing (100), the nut (200), the tail (300), the receiver (400), the screw (600), the retainer (700), the spring (800), the cam (900), and the secondary bushing (1000); while in a further embodiment the expansion device (500) is formed of a material different than at least two of the listed components, and at least 3 in an even further embodiment. In a further embodiment at least two of the following components are formed of the same material: the bushing (100), the nut (200), the tail (300), the receiver (400), the screw (600), the retainer (700), the spring (800), the cam (900), and the secondary bushing (1000); and in another embodiment at least three of the listed components are formed of the same material.

In the embodiments of FIGS. 16-36, one particular embodiment has a screw volume that is no more than 60% of the bushing volume, and no more than 50% and no more than 40% in still further embodiments. In a further embodiment a retainer volume is no more than the screw volume, and no more than 80% of the screw volume in another embodiment, and no more than 60% in still a further embodiment. The cam volume is greater than the retainer volume in one embodiment, and less than the screw volume in another embodiment. Additionally, the total volume of the expansion device(s) (500) is no more than 30% of the bushing volume in an embodiment, and no more than 25%, and 20% in still further embodiments. In one embodiment at least one of the bushing (100) and the screw (600) are no more than 5 grams, and no more than 4 grams, and no more than 3 grams in further embodiments, while the cam (900) is at least 0.1 grams, and at least 0.2 grams, and at least 0.3 grams in further embodiments; and these relationships are true for both the bushing (100) and the screw (600) in another embodiment. Further, the secondary bushing volume is greater than the sum of the bushing volume, the screw volume, the retainer volume, and the cam volume; in one particular series of embodiments the secondary bushing (1000) has a volume of less than 3 cc, and less than 2 cc in another embodiment, and less than 1.5 cc in still a further embodiment; while in another series of embodiments the secondary bushing (1000) is no more than 15 grams, and no more than 12 grams in another embodiment, and no more than 9 grams in still a further embodiment.

In one embodiment the retainer (700) is non-metallic and is no more than 1.0 grams, and no more than 0.5 grams, and 0.25 grams in further embodiments; while in a further embodiment the secondary bushing (1000) is also non-metallic and is no more than 5.0 grams, and no more than 3.0 grams, and no more than 2.0 grams in further embodiments; while in an even further embodiment the screw (600) is metallic yet is no more than the mass of the bushing (100). In a further embodiment at least one of the screw (600) and the cam (900) are 7075 aluminum alloy, while in a further embodiment at least one is non-metallic and has a mass of less than 0.5 grams, and less than 0.2 grams in another embodiment, and less than 0.1 grams in a further embodiment; and both are non-metallic in still another embodiment.

In still another embodiment at least one of the following components are formed of a nonmetallic material: the bushing (100), the nut (200), the tail (300), the receiver (400), the screw (600), the retainer (700), the spring (800), the cam (900), and the secondary bushing (1000); and in another embodiment the nonmetallic material has a density of less than 2 g/cc and one, or more, of the following properties: a ASTM D638 tensile strength of at least 30 Ksi at 160° F., a ASTM D638 tensile modulus of at least 3500 Ksi at 160° F., a ASTM D695 compressive strength of at least 33 Ksi at 160° F., a ASTM D695 compression modulus of at least 1000 Ksi at 160° F., a ASTM D6272 flexural strength of at least 42 Ksi at 160° F., a ASTM D6272 flexural modulus of at least 2800 Ksi at 160° F., a ASTM D5379 shear strength of at least 11 Ksi at 160° F., and a ASTM D5961 bearing strength of at least 36 Ksi at 160° F. In a further embodiment the nonmetallic material has a density of less than 1.80 g/cc, and less than 1.60 g/cc, and less than 1.50 g/cc in additional embodiments. In one embodiment the nonmetallic material is a carbon fiber reinforced plastic material. In one embodiment the strain relationships are achieved by having the primary portion 10000 formed of a polyamide resin, while in a further embodiment the polyamide resin includes fiber reinforcement, and in yet another embodiment the polyamide resin includes at least 35% fiber reinforcement. In one such embodiment the fiber reinforcement includes long-glass fibers having a length of at least 10 millimeters pre-molding and produce a finished primary portion 10000 having fiber lengths of at least 3 millimeters, while another embodiment includes fiber reinforcement having short-glass fibers with a length of at least 0.5-2.0 millimeters pre-molding. Incorporation of the fiber reinforcement increases the tensile strength of the primary portion 10000, however it may also reduce the primary portion elongation to break therefore a careful balance must be struck to maintain sufficient elongation. Therefore, one embodiment includes 35-55% long fiber reinforcement, while in an even further embodiment has 40-50% long fiber reinforcement. One specific example is a long-glass fiber reinforced polyamide 66 compound with 40% carbon fiber reinforcement, such as the XuanWu W5801 resin having a tensile strength of 245 megapascal and 7% elongation at break. Long fiber reinforced polyamides, and the resulting melt properties, produce a more isotropic material than that of short fiber reinforced polyamides, primarily due to the three-dimensional network formed by the long fibers developed during injection molding. Another advantage of long-fiber material is the almost linear behavior through to fracture resulting in less deformation at higher stresses.

In one embodiment the density of the expansion device (500) is no more than 8 g/cc, and no more than 6.8 g/cc in another embodiment, and the expansion device (500) has an elongation to break of at least 5%, at least 7%, 9%, 11%, 13%, and 14.5% in additional embodiments. The necessary strain and elongation requirements for durability must be balanced with the need for strength and durability in the connection. Traditional design practices of simply designing the components to be as strong as possible does not provide the needed durability of the blind fastener. In another embodiment the ultimate tensile strength is 754 and 960 MPa, and in another embodiment the melting point is less than 1350 degrees Celsius, while in a further embodiment the coefficient of thermal expansion is no more than 14 ($10^{-6}$/° C.), and the Young's Modulus is no more than 90 GPa in another embodiment, and the Ultimate Tensile Strength is no more than 1600 MPa in yet a further embodiment, and the Yield Strength is less than 150 MPa in still another embodiment. The expansion device (500) is a super-elastic material in one embodiment, which may include a NiTi or Ni—Ti—Cu alloy system, Copper-Zinc-Aluminum (CuZnAl) alloy system, Fe—Mn—Si and Fe—Ni—Co—Ti alloy systems, and Fe—Ni—Al alloy systems. In another embodiment the expansion device (500) is a high strength stainless steel alloy with a minimum tensile strength of 270 Ksi, and in a further embodiment no more than 300 Ksi.

Superelastic behavior of Nitinol is usually characterized through cyclic tensile testing per ASTM F2516. A typical cyclic tensile curve for superelastic Nitinol can be broken into several different segments. During initial loading the austenite phase exhibits typical elastic deformation up until the Upper Plateau Stress (UPS) is reached. Once the UPS has been reached an isostress condition is observed as the cubic austenite structure shears into detwinned stress induced martensite (SIM), followed by the elastic deformation of the detwinned SIM structure. Just as for the thermally induced phase transformation, the formation of SIM is reversible. During unloading elastic strain is recovered and the SIM transforms back into the parent austenite phase. The recovery stress (or Lower Plateau Stress, LPS) is lower than UPS. The hysteresis observed arises from internal friction and defects in the crystal structure. In one embodiment the expansion device (500) exhibits superelasticity up to at least 8% strain before permanent deformation begins. In another embodiment the Upper Plateau Stress (UPS) is at least 600 MPa, while in a further embodiment the Lower Plateau Stress (LPS) is at least 375 MPa, The lower plateau strength/stress (LPS) is the stress measured at 2.5% strain during tensile unloading of the sample, after loading to 6% strain per the method described in ASTM F2516. Superelasticity is defined as nonlinear recoverable deformation behavior of the shape memory alloys that occurs at temperatures above Af but below Md, where the austenite finish temperature (Af) is the temperature at which martensite (or R-phase) to austenite, and martensite deformation temperature (Md) is the highest temperature at which martensite will form from the austenite phase in response to an applied stress. At temperature above Md the shape memory alloy will not exhibit superelasticity it will rather exhibit a typical elastic-plastic behavior when loaded. In one embodiment the temperature in which austenite is complete is between −20° C. to −10° C., and provides a % elongation of at least 10% and an ultimate tensile strength of at least 1250 MPa.

In a still further embodiment the expansion device (500) if formed of a nonmetallic material having a density of less than 2 g/cc and an elongation to break of at least 3% in one embodiment, and at least 4%, 5%, 6%, 7%, and 8% in further embodiments. In a further embodiment the nonmetallic material has a density of less than 1.80 g/cc, and less than 1.60 g/cc, and less than 1.40 g/cc, and less than 1.2 g/cc in additional embodiments. In an embodiment the nonmetallic material is a thermoplastic material, and a Polyetherimide (PEI) in a further embodiment, and, in still more embodiments, any of the following materials that meet the claimed mechanical properties: polycaprolactam, a polyhexamethylene adipinamide, or a copolymer of hexamethylene diamine adipic acid and caprolactam, however other embodiments may include polypropylene (PP), nylon 6 (polyamide 6), polybutylene terephthalates (PBT), thermoplastic polyurethane (TPU), PC/ABS alloy, PPS, PEEK, and semi-crystalline engineering resin systems that meet the claimed mechanical properties. In one embodiment the nonmetallic material has one, or more, of the following properties: a tensile strength of at least 20 Ksi, a tensile modulus of at least 1000 Ksi, a flexural strength of at least 30 Ksi, a flexural modulus of at least 900 Ksi, a compressive strength of at least 20 Ksi, a compressive modulus of at least 450 Ksi, a shear strength of at least 13 Ksi, and a Rockwell M scale hardness of at least 105.

In one such embodiment the elastic strain of the expansion device (500) is at least 1%, and at least 2%, 3%, 4%, 5%, 6%, 7%, and 8% in further embodiments; and 4-9% in an embodiment, 5-8% in another embodiment, and 5.5-7.5% in still a further embodiment. The elastic strain is exhibited throughout the range of −150° C. to at least about 750° C. in one embodiment, and further possesses a shape memory effect in another embodiment with a transition temperature of at least 60° F., at least 70° F. in another embodiment, and at least 80° F. in still a further embodiment; while another series of embodiments caps the transition temperature range at no more than 250° F., and no more than 225° F., 200° F., and 190° F. in additional embodiments. In one embodiment the expansion device (500) has a Rockwell C scale hardness of no more than 80, and 70, and 65 in further embodiments. The harness of the expansion device (500) is greater than the hardness of the transition (630) and/or cam transition (950), and in one particular embodiment at least a portion of the expansion device (500) is composed of material having a Rockwell B-Scale hardness, or C-Scale hardness, that is at least 5 units higher, on the same Rockwell hardness scale, than the transition (630) and/or cam transition (950), while in a further embodiment it is at least 7.5 units higher, and at least 10 units higher in still a further embodiment. In another series of embodiments the hardness of the transition (630) and/or cam transition (950) is plus or minus 10 Rockwell scale hardness units, either on the B Scale or the C Scale, from the hardness of the expansion device (500), plus or minus 5 Rockwell scale hardness units in another embodiment, and plus or minus 2 Rockwell scale hardness units in another embodiment.

In still another embodiment at least one of the following components are formed of a metallic material with a density of less than 4.6 g/cc in one embodiment, and less than 3 g/cc in yet another embodiment: the bushing (100), the nut (200), the tail (300), the receiver (400), the screw (600), the retainer (700), the spring (800), the cam (900), and the secondary bushing (1000); and in another embodiment the material has one, or more, of the following properties: an ultimate tensile strength of at least 68 Ksi, and at least 80 Ksi in anther embodiment; a tensile yield strength of at least 47 Ksi, and at least 70 Ksi in another embodiment; an elongation to break of at least 9% in one embodiment, and at least 11% in another embodiment, and at least 13%, 15%, 17%, and 19% in still further embodiments; and/or a modulus of elasticity of at least 9000 Ksi in one embodiment, and at least 10000 Ksi in another embodiment.

In a particular series of aerospace embodiments balancing all the factors and relationships disclosed herein and placing more emphasis on strength, the bushing (100), the nut (200), and the screw (600) are formed of the same material, which in one embodiment is A286 stainless steel; while in a further embodiment the expansion device (500) is austenite nitinol #3; and in another embodiment having a retainer (700) it is fiber reinforced plastic; and in yet another embodiment the spring (800) is 304 stainless steel with a spring temper; and in a further embodiment the cam (900) is a 304 stainless steel. In an another series of aerospace embodiments balancing all the factors and relationships disclosed herein and placing more emphasis on strength, the bushing (100), the nut (200), and the screw (600) are formed of the same material, which in one embodiment is 301 stainless steel; while in a further embodiment the expansion device (500) is In a particular series of aerospace embodiments balancing all the factors and relationships disclosed herein and placing more emphasis on strength, the bushing (100), the nut (200), and the screw (600) are formed of the same material, which in one embodiment is A286 stainless steel; while in a further embodiment the expansion device (500) is austenite nitinol #3; and in another embodiment having a retainer (700) it is fiber reinforced plastic; and in yet another embodiment the spring (800) is 304 stainless steel with a spring temper; and in a further embodiment the cam (900) is a 304 stainless steel; and in another embodiment having a retainer (700) it is A286 stainless steel; and in yet another embodiment the spring (800) is 302 stainless steel with a spring temper; and in a further embodiment the cam (900) is a 303 stainless steel.

In a particular series of aerospace embodiments balancing all the factors and relationships disclosed herein and placing more emphasis on weight, the bushing (100) is fiber reinforced plastic; the nut (200) is Polyetherimide (PEI) or equivalent; the screw (600) is aluminum alloy, preferably 7075 t6 anodized; while in a further embodiment the expansion device (500) is austenite nitinol #3; and in another embodiment having a retainer (700) it is Polyetherimide (PEI) or equivalent; and in yet another embodiment the spring (800) is 304 stainless steel with a spring temper; and in a further embodiment the cam (900) is aluminum alloy, preferably 7075 t6 anodized. While in an even further embodiment all the components, except the spring (800), are formed of Polyetherimide (PEI) or equivalent, with the spring (800) formed of 304 stainless steel with a spring temper.

Some examples of metal alloys that can be used to form the components of the blind fastener include, without limitation, magnesium alloys, aluminum/aluminum alloys (e.g., 3000 series alloys, 5000 series alloys, 6000 series alloys, such as 6061-T6, and 7000 series alloys, such as 7075, just to name a few), titanium alloys (e.g., 3-2.5, 6-4, SP700, 15-3-3-3, 10-2-3, and other alpha/near alpha, alpha-beta, and beta/near beta titanium alloys, just to name a few), carbon steels (e.g., 1020 and 8620 carbon steel, just to name a few), stainless steels (e.g., A286, 301, 302, 303, 304 and 410 stainless steel), PH (precipitation-hardenable) alloys (e.g., 17-4, C450, and C455 alloys, just to name a few), copper alloys, and nickel alloys.

Another embodiment tunes the galvanic compatibility of the components of the blind fastener, along with the previously disclosed balancing of relationships, to provide preferential galvanic compatibility. Thus, in one embodiment there is no more than a 0.50 V difference in the "Anodic Index" between any two of the components that come in contact with one another, while in another embodiment there is no more than a 0.25 V difference in the "Anodic Index" between any two of the components that come in contact with one another, and in yet another embodiment there is no more than a 0.15 V difference in the "Anodic Index" between any two of the components that come in contact with one another; per the galvanic data from MIL-STD-889.

Numerous alterations, modifications, and variations of the embodiments disclosed herein will be apparent to those skilled in the art and they are all anticipated and contemplated to be within the spirit and scope of the instant invention. For example, although specific embodiments have been described in detail, those with skill in the art will understand that the preceding embodiments and variations can be modified to incorporate various types of substitute and or additional or alternative materials, relative arrangement of elements, and dimensional configurations. Accordingly, even though only few variations of the present invention are described herein, it is to be understood that the practice of such additional modifications and variations and the equivalents thereof, are within the spirit and scope of the invention as defined in the following claims.

I claim:

1. A reusable blind fastener, comprising:

a bushing (100), a nut (200), a tail (300), a receiver (400), an expansion device (500), and a screw (600);

the bushing (100) having a bushing distal end (102), a bushing proximal end (104), a bushing length (106) between the bushing distal end (102) and the bushing proximal end (104), a bushing head (120), a bushing insert portion (130), and a bushing bore (110) extending through the bushing (100) from the bushing distal end (102) to the bushing proximal end (104), wherein the bushing head (120) has a bushing head thickness (126), a bushing head perimeter (122) including at least one bushing head gripping surface (124), a bushing head max dimension (128), and a minimum head flange dimension (129), wherein the bushing insert portion (130) has an insert distal end (132), an insert proximal end (134), an insert length (136), and an insert wall thickness (138), and wherein the bushing bore (110) has a bushing bore longitudinal axis, a bushing bore distal end (112), a bushing bore proximal end (114), a bushing bore length (116) between the bushing bore distal end (112) and the a bushing bore proximal end (114), and a bushing bore diameter (118);

the nut (200) having a nut distal end (202), a nut proximal end (204), a nut length (206) from the nut distal end (202) to the nut proximal end (204), a nut bore (210) having a nut bore longitudinal axis, a nut bore distal end (212), a nut bore proximal end (214), a nut bore length (216) between the nut bore distal end (212) and the nut bore proximal end (214), a nut bore diameter (218), and a nut wall thickness (218);

the tail (300) extending from the bushing (100), and having a tail distal end (302), a tail proximal end (304), a tail length (306) between the tail distal end (302) and the tail proximal end (304), a tail thickness (308), a tail dextral wall (310), a tail sinistral wall (312), and a tail width (314) measured along an exterior surface of the tail (300) in a direction perpendicular to the bushing bore longitudinal axis;

the receiver (400) is formed in the nut (200) and having a receiver distal end (402), a receiver proximal end (404), a receiver length (406), a receiver depth (408), a receiver dextral wall (410), a receiver sinistral wall (412), and a receiver width (414) between the receiver dextral wall (410) and the receiver sinistral wall (412) in a direction perpendicular to the nut bore longitudinal axis;

the expansion device (500) having an ED distal wall (502), an ED proximal wall (504), an ED length (506) from the ED distal wall (502) to the ED proximal wall (504), an ED exterior surface (510) that is discontinuous and having an initial sinistral gap opening point (527A) and an initial dextral gap opening point (527B), which define an ED initial exterior surface gap angle (526), an ED interior surface (512), and an ED thickness (508) from the ED exterior surface (510) to the ED interior surface (512), wherein the expansion device (500) has an initial undeformed state with an ED initial max dimension (518) and the ED initial exterior surface gap angle (526), and an expanded state with an ED expanded max dimension (520) greater than the ED initial max dimension (518) whereby the initial sinistral gap opening point (527A) and the initial dextral gap opening point (527B) have spread apart to an expanded sinistral gap opening point (529A) and an expanded dextral gap opening point (529B), which define an ED expanded exterior surface gap angle (528) greater than the ED initial exterior surface gap angle (526);

the screw (600) having a screw distal end (602), a screw proximal end (604), and a screw length (606) between the screw distal end (602) and the screw proximal end (604), a shank (610), a threaded portion (620), a transition (630) separating the shank (610) and threaded portion (620), wherein the shank (610) includes a shank distal end (612), a shank proximal end (614), a shank length (616) from the shank distal end (612) to the shank proximal end (614), and a shank cross-sectional dimension (618), wherein the threaded portion (620) has a threaded portion distal end (622), a threaded portion proximal end (624), a threaded portion length (626) from the threaded portion distal end (622) to the threaded portion proximal end (624), and a threaded portion cross-sectional dimension (628), and wherein the transition (630) has a transition portion distal end (632), a transition portion proximal end (634), a transition portion length (636) between the transition portion distal end (632) and the transition portion proximal end (634), a transition portion cross-sectional dimension (638), and a transition angle (640);

wherein the screw (600) extends through the bushing (100) via the bushing bore (110), the expansion device (500) is received over the screw distal end (602) until the expansion device (500) contacts the transition portion (630), and the nut bore (210) engages the screw threaded portion (620), such that with the bushing (100) held stationary, rotation of the screw (600) draws the nut (200) toward the bushing (100) with the tail (300) cooperating with the receiver (400) to prevent the nut (200) from rotating as the screw (600) is rotated, and resulting in the nut (200) forcing the expansion device (500) from the initial undeformed state at the ED first position (530) abutting the transition (630) to the expanded state at the ED second position (532) on the transition (630), thereby moving an ED translation distance (534), which elastically deforms the expansion device (500) and changes the ED initial max dimension (518) to the ED expanded max dimension (520), and the ED initial exterior surface gap angle (526) to the ED expanded exterior surface gap angle (528); and wherein every 10 degree increase from the ED initial exterior surface gap angle (526) to the ED expanded exterior surface gap angle (528) results in at least a 1% increase of the ED initial max dimension (518) to the ED expanded max dimension (520).

2. The reusable blind fastener of claim 1, wherein the ED expanded exterior surface gap angle (528) is at least 20% greater than the ED initial exterior surface gap angle (526).

3. The reusable blind fastener of claim 2, wherein the ED initial exterior surface gap angle (526) is less than 75 degrees.

4. The reusable blind fastener of claim 2, wherein every 10 degree increase from the ED initial exterior surface gap angle (526) to the ED expanded exterior surface gap angle (528) results in no more than a 4.5% increase of the ED initial max dimension (518) to the ED expanded max dimension (520).

5. The reusable blind fastener of claim 2, wherein the transition angle (640) is no more than 12.0 degrees.

6. The reusable blind fastener of claim 2, wherein the tail dextral wall (310) and the tail sinistral wall (312) converge toward one another at a tail taper (316), and imaginary lines extending from the tail dextral wall (310) and the tail sinistral wall (312) converge to a tail convergence point (313).

7. The reusable blind fastener of claim 6, wherein when the nut (200) has forced the expansion device (500) to the expanded state at the ED second position (532) on the transition (630), the tail convergence point (313) is located beyond the nut distal end (202).

8. The reusable blind fastener of claim 6, wherein the receiver dextral wall (410) and the receiver sinistral wall (412) converge toward one another at a receiver taper (416).

9. The reusable blind fastener of claim 8, wherein the receiver taper (416) is less than the tail taper (316).

10. The reusable blind fastener of claim 6, wherein the tail taper (316) is no more than 24 degrees.

11. The reusable blind fastener of claim 2, wherein the tail width (314) is at least 25% of the bushing bore diameter (118) and no greater than 70% of the ED initial max dimension (518).

12. The reusable blind fastener of claim 2, wherein the expansion device (500) includes at least two independent expansion devices adjacent to one another, and the sum of each ED length (506) is at least 50% of the bushing head thickness (126).

13. The reusable blind fastener of claim 2, wherein the tail length (306) is at least 50% of the nut length (206), and the minimum tail width (314) is at least 25% of the tail length (306).

14. The reusable blind fastener of claim 2, wherein the density of the expansion device (500) is no more than 6.8 g/cc, and the expansion device (500) has an elongation to break of at least 7%.

15. The reusable blind fastener of claim 14, wherein the expansion device (500) is formed of NiTi or Ni—Ti—Cu alloy.

16. The reusable blind fastener of claim 14, wherein at least one of the nut (200) and the screw (600) are formed of a metallic material with a density of less than 4.6 g/cc, and the bushing (100) is non-metallic and is no more than 2.0 grams.

17. A reusable blind fastener, comprising:
a bushing (100), a nut (200), a tail (300), a receiver (400), an expansion device (500), and a screw (600);
the bushing (100) having a bushing distal end (102), a bushing proximal end (104), a bushing length (106) between the bushing distal end (102) and the bushing proximal end (104), and a bushing bore (110) extending through the bushing (100) from the bushing distal end (102) to the bushing proximal end (104), wherein the bushing bore (110) has a bushing bore longitudinal axis and a bushing bore diameter (118);
the nut (200) having a nut distal end (202), a nut proximal end (204), a nut length (206) from the nut distal end (202) to the nut proximal end (204), a nut bore (210) having a nut bore longitudinal axis, a nut bore distal end (212), a nut bore proximal end (214), a nut bore length (216) between the nut bore distal end (212) and the nut bore proximal end (214), a nut bore diameter (218), and a nut wall thickness (218);
the tail (300) extending from the bushing (100), and having a tail distal end (302), a tail proximal end (304), a tail length (306) between the tail distal end (302) and the tail proximal end (304), a tail thickness (308), a tail dextral wall (310), a tail sinistral wall (312), and a tail width (314) measured along an exterior surface of the tail (300) in a direction perpendicular to the bushing bore longitudinal axis, wherein the tail length (306) is at least 50% of the nut length (206), and the minimum tail width (314) is at least 25% of the tail length (306);
the receiver (400) is formed in the nut (200) and having a receiver distal end (402), a receiver proximal end (404), a receiver length (406), a receiver dextral wall (410), a receiver sinistral wall (412), and a receiver width (414) between the receiver dextral wall (410) and the receiver sinistral wall (412) in a direction perpendicular to the nut bore longitudinal axis;
the expansion device (500) having an ED distal wall (502), an ED proximal wall (504), an ED length (506) from the ED distal wall (502) to the ED proximal wall (504), an ED exterior surface (510) that is discontinuous and having an initial sinistral gap opening point (527A) and an initial dextral gap opening point (527B), which define an ED initial exterior surface gap angle (526), an ED interior surface (512), and an ED thickness (508) from the ED exterior surface (510) to the ED interior surface (512), wherein the expansion device (500) has an initial undeformed state with an ED initial max dimension (518) and the ED initial exterior surface gap angle (526), and an expanded state with an ED expanded max dimension (520) greater than the ED initial max dimension (518) whereby the initial sinistral gap opening point (527A) and the initial dextral gap opening point (527B) have spread apart to an expanded sinistral gap opening point (529A) and an expanded dextral gap opening point (529B), which define an ED expanded exterior surface gap angle (528) greater than the ED initial exterior surface gap angle (526);
the screw (600) having a screw distal end (602), a screw proximal end (604), and a screw length (606) between the screw distal end (602) and the screw proximal end (604), a shank (610), a threaded portion (620), a transition (630) separating the shank (610) and threaded portion (620), wherein the shank (610) includes a shank distal end (612), a shank proximal end (614), a shank length (616) from the shank distal end (612) to the shank proximal end (614), and a shank cross-sectional dimension (618), wherein the threaded portion (620) has a threaded portion distal end (622), a threaded portion proximal end (624), a threaded portion length (626) from the threaded portion distal end (622) to the threaded portion proximal end (624), and a threaded portion cross-sectional dimension (628), and wherein the transition (630) has a transition portion distal end (632), a transition portion proximal end (634), a transition portion length (636) between the transition portion distal end (632) and the transition portion proximal end (634), a transition portion cross-sectional dimension (638), and a transition angle (640);
wherein the screw (600) extends through the bushing (100) via the bushing bore (110), the expansion device (500) is received over the screw distal end (602) until the expansion device (500) contacts the transition portion (630), and the nut bore (210) engages the screw threaded portion (620), such that with the bushing (100) held stationary, rotation of the screw (600) draws the nut (200) toward the bushing (100) with the tail (300) cooperating with the receiver (400) to prevent the nut (200) from rotating as the screw (600) is rotated, and resulting in the nut (200) forcing the expansion device (500) from the initial undeformed state at the ED first position (530) abutting the transition (630) to the expanded state at the ED second position (532) on the transition (630), thereby moving an ED translation distance (534), which elastically deforms the expansion device (500) and changes the ED initial max dimension (518) to the ED expanded max dimension (520), and the ED initial exterior surface gap angle (526) to the ED expanded exterior surface gap angle (528); and wherein the ED expanded exterior surface gap angle (528) is at least 20% greater than the ED initial exterior surface gap angle (526), and the ED initial exterior surface gap angle (526) is less than 75 degrees.

18. The reusable blind fastener of claim 17, wherein every 10 degree increase from the ED initial exterior surface gap angle (526) to the ED expanded exterior surface gap angle (528) results in no more than a 4.5% increase of the ED initial max dimension (518) to the ED expanded max dimension (520).

19. The reusable blind fastener of claim 17, wherein the transition angle (640) is no more than 12.0 degrees, and the tail width (314) is at least 25% of the bushing bore diameter (118) and no greater than 70% of the ED initial max dimension (518).

20. The reusable blind fastener of claim 17, wherein the expansion device (500) includes at least two independent expansion devices adjacent to one another, and the sum of each ED length (506) is at least 50% of the bushing head thickness (126).

\* \* \* \* \*